(12) United States Patent
Azuma et al.

(10) Patent No.: US 12,202,426 B2
(45) Date of Patent: Jan. 21, 2025

(54) AIRBAG DEVICE

(71) Applicant: ASHIMORI INDUSTRY CO., LTD., Settsu (JP)

(72) Inventors: Hidetaka Azuma, Settsu (JP); Tsukasa Inaba, Settsu (JP); Tetsuro Hamada, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 18/283,399

(22) PCT Filed: Mar. 25, 2022

(86) PCT No.: PCT/JP2022/014572
§ 371 (c)(1),
(2) Date: Sep. 21, 2023

(87) PCT Pub. No.: WO2022/210403
PCT Pub. Date: Oct. 6, 2022

(65) Prior Publication Data
US 2024/0092303 A1    Mar. 21, 2024

(30) Foreign Application Priority Data

Mar. 31, 2021 (JP) ................................ 2021-059099
Mar. 31, 2021 (JP) ................................ 2021-059100

(51) Int. Cl.
*B60R 21/207* (2006.01)
*B60R 21/232* (2011.01)
*B60R 21/233* (2006.01)

(52) U.S. Cl.
CPC .......... *B60R 21/207* (2013.01); *B60R 21/232* (2013.01); *B60R 21/233* (2013.01);
(Continued)

(58) Field of Classification Search
CPC ........ B60R 21/233; B60R 2021/23308; B60R 2021/23324; B60R 2021/23316;
(Continued)

(56) References Cited

U.S. PATENT DOCUMENTS 3,586,347 A * 6/1971 Carey ................... B60R 21/233
280/729
5,464,250 A * 11/1995 Sato .................. B60R 21/23138
280/743.1
(Continued)

FOREIGN PATENT DOCUMENTS

JP    2007-520390 A    7/2007
JP    2012-96628 A     5/2012
(Continued)

OTHER PUBLICATIONS

International Search Report (PCT/ISA/210) dated Jun. 14, 2022, issued by the International Searching Authority in counterpart International Application No. PCT/JP2022/014572.
(Continued)

*Primary Examiner* — Paul N Dickson
*Assistant Examiner* — Tiffany L Webb
(74) *Attorney, Agent, or Firm* — Sughrue Mion, PLLC

(57) ABSTRACT

An airbag device includes an inflator configured to generate gas, a first panel including an edge portion, a first fixing portion, and a second fixing portion, the second fixing portion facing the first fixing portion, a regulating member provided inside the airbag. The regulating member includes a first portion fixed to the first fixing portion, and a second portion fixed to the second fixing portion. A length from the first fixing portion to the second fixing portion is longer than a length from the first portion to the second portion. The airbag includes main bag, and a sub inflation portion. In a state where the airbag is inflated and deployed, gas from the
(Continued)

inflator is introduced into the main bag, the first panel faces an occupant, and the sub inflation portion receives the occupant.

4 Claims, 27 Drawing Sheets

(52) U.S. Cl.
CPC .............. *B60R 2021/23308* (2013.01); *B60R 2021/23324* (2013.01)

(58) Field of Classification Search
CPC .... B60R 2021/2334; B60R 2021/2338; B60R 2021/23382
See application file for complete search history.

(56) References Cited

U.S. PATENT DOCUMENTS

| | | | |
|---|---|---|---|
| 8,414,022 B2* | 4/2013 | Song | B60R 21/2338 280/743.2 |
| 8,474,864 B2* | 7/2013 | Azuma | B60R 21/2346 280/730.2 |
| 9,409,542 B2* | 8/2016 | Fujiwara | D05B 13/00 |
| 10,994,691 B2* | 5/2021 | Wasilewska | B60R 21/231 |
| 2008/0023945 A1 | 1/2008 | Zauritz et al. | |
| 2012/0286500 A1 | 11/2012 | Wiik et al. | |
| 2017/0225640 A1 | 8/2017 | Ohno | |
| 2020/0047702 A1 | 2/2020 | Wasilewska et al. | |

FOREIGN PATENT DOCUMENTS

| | | |
|---|---|---|
| JP | 2012-254712 A | 12/2012 |
| JP | 2013-147041 A | 8/2013 |
| JP | 2016-22751 A | 2/2016 |
| JP | 2017-140945 A | 8/2017 |
| JP | 2019-18651 A | 2/2019 |
| JP | 2019-531225 A | 10/2019 |

OTHER PUBLICATIONS

Written Opinion (PCT/ISA/237) dated Jun. 14, 2022, issued by the International Searching Authority in counterpart International Application No. PCT/JP2022/014572.

* cited by examiner

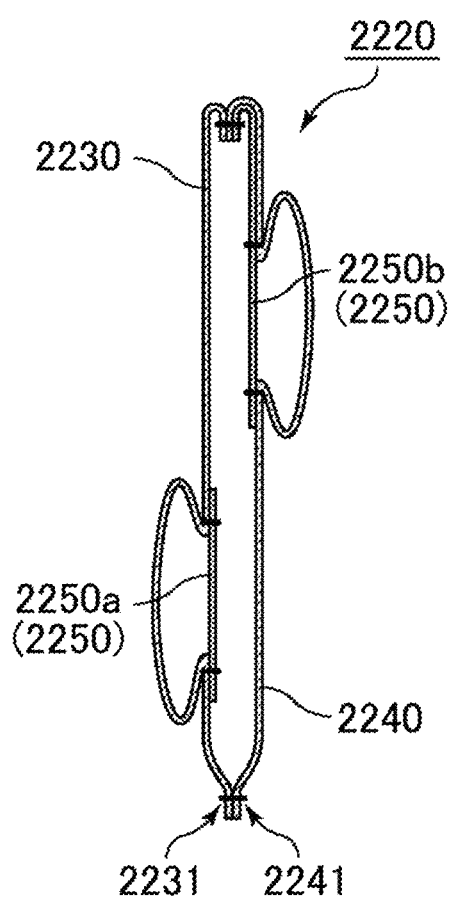

AIRBAG DEVICE

CROSS-REFERENCE TO RELATED APPLICATIONS

This application is a National Phase Entry of PCT International Application No. PCT/JP2022/014572 filed on Mar. 25, 2022, which claims priority to Japanese Patent Application No. 2021-059099 filed on Mar. 31, 2021, and Japanese Patent Application No. 2021-059100 filed on Mar. 31, 2021, the contents of all of which are incorporated herein by reference in their entirety.

TECHNICAL FIELD

The present invention relates to an airbag device. More specifically, the present invention relates to an airbag device that inflates and deploys at the time of a side impact of a vehicle such as an automotive vehicle, in order to protect an occupant.

BACKGROUND ART

As an airbag device that inflates and deploys at the time of a side impact of a vehicle such as an automotive vehicle to protect an occupant, a side airbag device that inflates and deploys between a side wall on a vehicle interior side of the vehicle (hereinafter, simply referred to as a "vehicle side wall") and the occupant seated in a seat, and a curtain airbag device that inflates and deploys from an upper side to a lower side of the vehicle side wall are known.

For example, Patent Literature 1 discloses a side airbag device for a vehicle that restrains a chest portion by a sub-chamber provided on an occupant side of a main chamber and having a lower pressure than that of the main chamber, and reduces a restraining force of the chest portion, in order to protect a part of an occupant that is weak against an impact.

CITATION LIST

Patent Literature

Patent Literature 1: JP2013-147041A
Patent Literature 2: JP2012-096628A

SUMMARY OF INVENTION

Technical Problem

However, in the side airbag device disclosed in Patent Literature 1, since the sub-chamber is formed by slackening a base cloth or sewing the base cloth to the main chamber while tacking the base cloth, manufacturing becomes complicated (see FIGS. 8 and 9).

The present invention has been made in view of the above circumstances, and an object of the present invention is to provide a side airbag device, which can be manufactured easily, capable of safely protecting an occupant.

Solution to Problem

An aspect of the present invention is an airbag device including:
an inflator configured to generate gas;
a first panel including:
  an edge portion;
  a first fixing portion that is a portion different from the edge portion; and
  a second fixing portion that is a portion different from the edge portion, the second fixing portion facing the first fixing portion;
a second panel including an edge portion coupled to the edge portion of the first panel, the second panel defining a bag-shaped airbag together with the first panel; and
a regulating member provided within the airbag, the regulating member including:
  a first portion fixed to the first fixing portion; and
  a second portion fixed to the second fixing portion,
in which a length from the first fixing portion to the second fixing portion of the first panel is longer than a length from the first portion to the second portion of the regulating member,
the airbag includes:
  a main bag defined by:
    the first panel excluding a portion between the first fixing portion and the second fixing portion;
    the second panel; and
    the regulating member, and a sub inflation portion defined by:
    the first panel between the first fixing portion and the second fixing portion; and
    the regulating member, and
  in a state where the airbag is inflated and deployed, gas from the inflator is introduced into the main bag, the first panel faces an occupant, and the sub inflation portion receives the occupant.

An aspect of the present invention is an airbag device that inflates and deploys on a lateral side of an occupant seated on a seat of a vehicle, the airbag device including:
an inflator configured to generate gas;
a first panel including:
  an edge portion;
  a first fixing portion; and
  a second fixing portion facing the first fixing portion;
a second panel including an edge portion coupled to the edge portion of the first panel, the second panel defining a bag-shaped airbag together with the first panel; and
a regulating member provided within the airbag, the regulating member including:
  a first portion fixed to the first fixing portion; and
  a second portion fixed to the second fixing portion,
in which at least one of the first fixing portion or the second fixing portion is provided at a position different from a position of the edge portion of the first panel,
a length from the first fixing portion to the second fixing portion of the first panel is longer than a length from the first portion to the second portion of the regulating member,
the airbag includes:
  a main bag defined by:
    the first panel excluding a portion between the first fixing portion and the second fixing portion;
    the second panel; and
    the regulating member; and
  a sub inflation portion defined by:
    the first panel between the first fixing portion and the second fixing portion; and
    the regulating member, and
  in a state where the airbag is inflated and deployed, gas from the inflator is introduced into the main bag, the second panel faces the occupant, and the sub inflation portion comes into contact with the vehicle.

Advantageous Effects of Invention

According to the present invention, it is possible to provide a side airbag device, which can be manufactured easily, capable of safely protecting an occupant.

BRIEF DESCRIPTION OF DRAWINGS

FIG. 31C is a schematic cross-sectional view of a first regulating member and a second regulating member, which is a view illustrating the manufacturing process of the side airbag according to the fourth embodiment.

DESCRIPTION OF EMBODIMENTS

First Embodiment

Figure 1A:
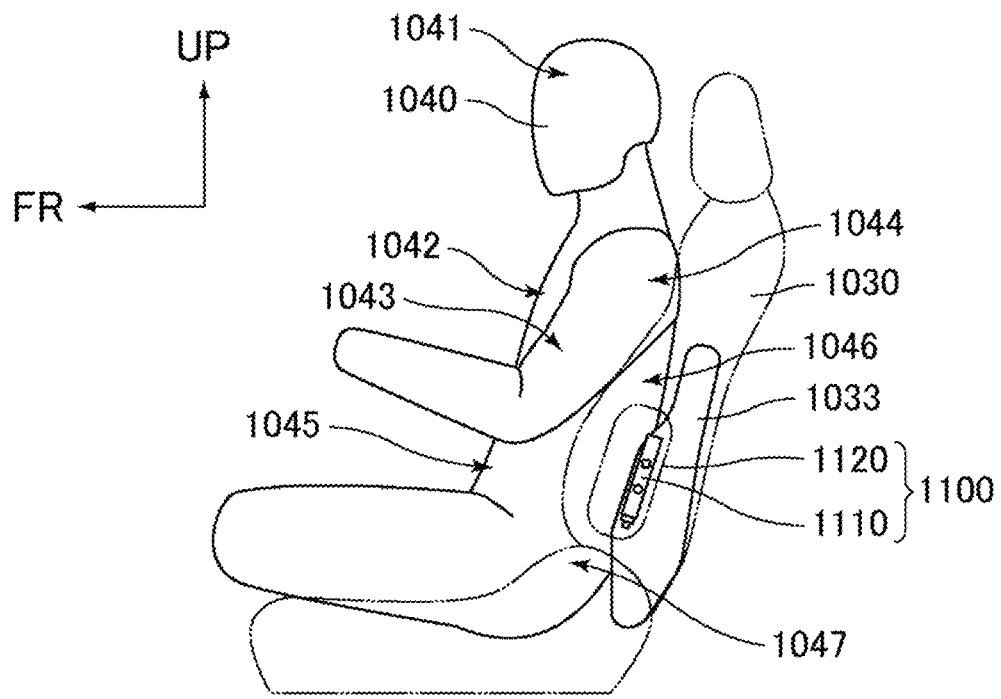
FIG. 1A is a schematic view illustrating a state, as viewed from a lateral side, of a side airbag of an airbag device according to a first embodiment, before inflation and deployment.

Hereinafter, an airbag device according to a first embodiment will be described with reference to the drawings. Statements relating to directions in the present description are based on a vehicle unless otherwise specified, for example, "front" indicates a front direction of the vehicle, "rear" indicates a rear direction of the vehicle, "upper side" indicates an upper direction of the vehicle, "lower side" indicates a lower direction of the vehicle, and "lateral side" indicates an outer direction in a vehicle width direction. In addition, an arrow FR indicates the front direction of the vehicle, an arrow UP indicates the upper direction of the vehicle, and an arrow OUT indicates the outer direction in the width direction of the vehicle, which are illustrated in the drawings as appropriate. Members disposed inside a vehicle seat are illustrated in a state where the vehicle seat is seen through.

FIG. 1A is a schematic view illustrating a state, as viewed from a lateral side, of a side airbag of an airbag device according to a first embodiment, before inflation and deployment. In addition, FIG. 1B illustrates the state as viewed from an upper side.

Figure 1B:
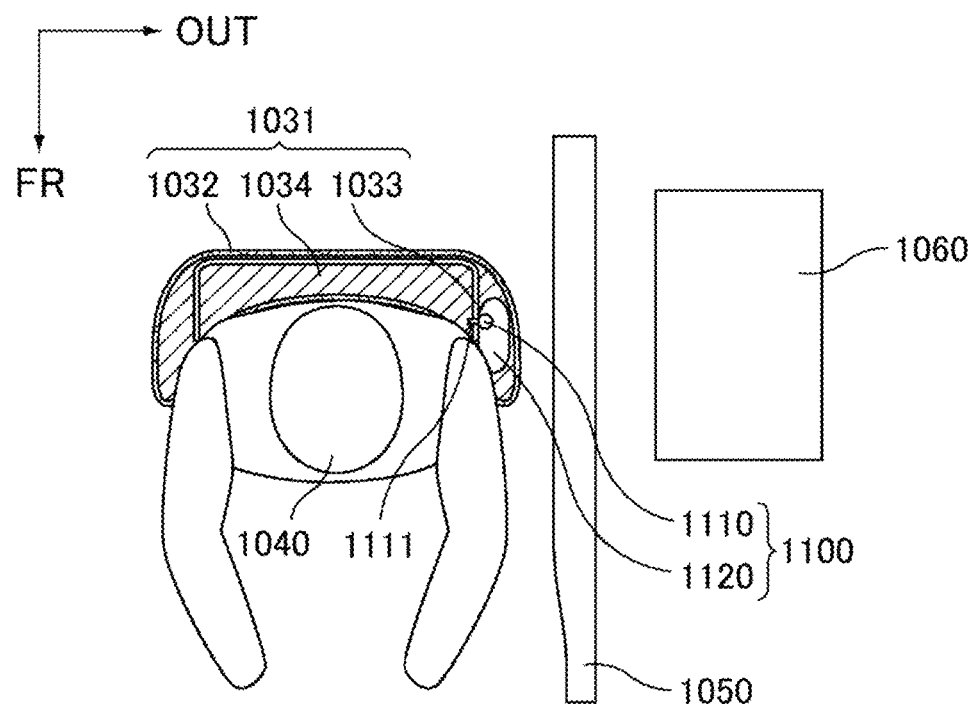
FIG. 1B is a schematic view illustrating the state, as viewed from an upper side, of the side airbag of the airbag device according to the first embodiment, before inflation and deployment.

As illustrated in FIGS. 1A and 1B, an airbag device 1100 is a side airbag device, and is attached to a side portion (side portion on a vehicle side wall 1050 side) of a seat back (backrest portion) 1031 of a vehicle seat 1030.

The vehicle seat 1030 is assumed to be, for example, a driver seat or a passenger seat of the vehicle.

In the present embodiment, a world side impact dummy (World-SID) 1040 is seated on the vehicle seat 1030. A sitting posture of the world side impact dummy 1040 is determined by a side impact test method (ECE R95) currently adopted in Japan and Europe, and by a side impact test method (FMVSS214) currently adopted in the United States. A position and a size of an airbag at the time of inflation and deployment are set according to positions of a head portion 1041, a chest portion 1042, an arm portion 1043, a shoulder portion 1044, an abdomen portion 1045, a back portion 1046, and a waist portion 1047 of the world side impact dummy 1040 as illustrated in FIG. 1A. Hereinafter, the world side impact dummy 1040 is referred to as an "occupant 1040".

The vehicle side wall 1050 is not particularly limited as long as the vehicle side wall 1050 is a vehicle body portion located on a lateral side of the occupant 1040 seated in the vehicle seat 1030, and is a collective name for a side door, a pillar, a side window, and the like.

As illustrated in FIG. 1A, the airbag device 1100 includes a bag-shaped side airbag 1120 folded up in an inflatable and deployable manner, and an inflator 1110 disposed within the side airbag 1120.

The side airbag 1120 is a bag-shaped body. Before being inflated and deployed, the side airbag 1120 is fixed to a side portion of a side frame 1033 located at the side portion of the seat back 1031 in a folded up state, and is covered and stored with a cover 1032 of the seat back 1031 together with a cushion pad 1034.

The inflator 1110 is a cylindrical (columnar) gas generator, and is disposed along an extension direction (height direction) of the seat back 1031. A pair of bolts 1111 protrude from an upper side portion and a lower side portion of the inflator 1110, and the pair of bolts 1111 penetrate through the side airbag 1120. The inflator 1110 is attached to the side frame 1033 of the seat back 1031 by the pair of bolts 1111.

The inflator 1110 is configured to be activated in an emergency of the vehicle, for example, at the time of a side impact of the vehicle. Specifically, first, in a case where an impact detection sensor mounted on the vehicle detects a side impact of the vehicle, an electronic control unit (ECU) calculates a signal sent from the impact detection sensor to determine an impact level. Then, in a case where the determined impact level corresponds to a case where the side airbag 1120 is inflated, the inflator 1110 is ignited, and gas is generated by a chemical reaction due to combustion. As a result, the gas generated from the inflator 1110 is introduced into the side airbag 1120.

A type of the inflator 1110 is not particularly limited, and examples thereof include a pyro-type inflator using gas generated by combusting a gas generating agent, a stored inflator using compressed gas, and a hybrid inflator using mixed gas of gas generated by combusting a gas generating agent and compressed gas.

Figure 2A:
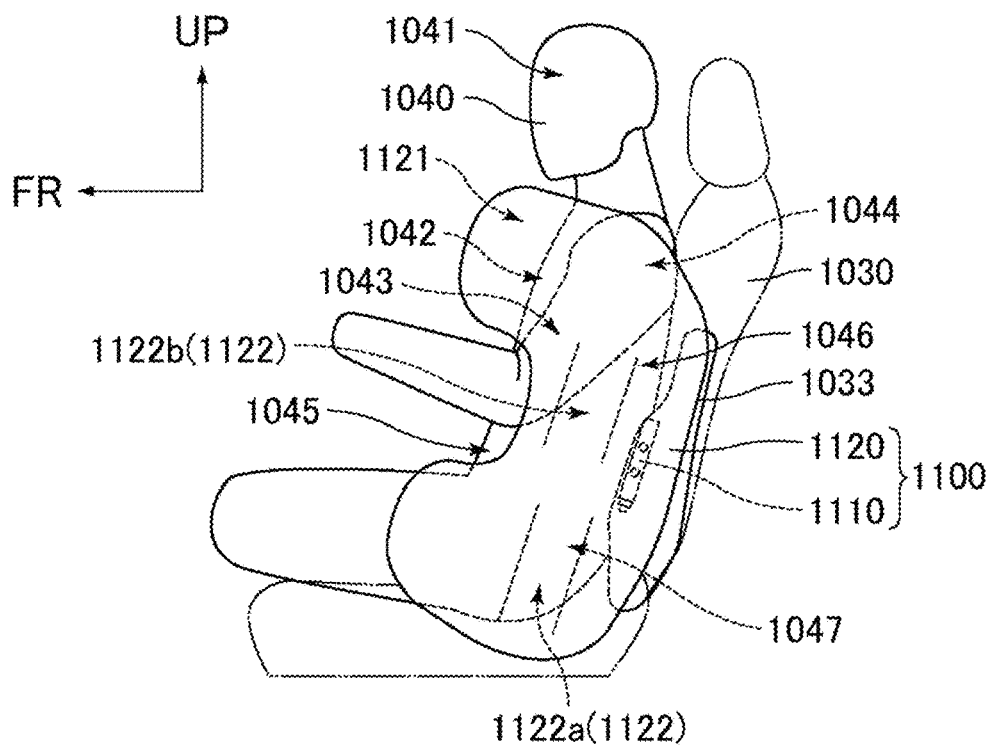
FIG. 2A is a schematic view illustrating a state, as viewed from the lateral side, of the side airbag of the airbag device according to the first embodiment, after inflation and deployment.
Figure 2B:
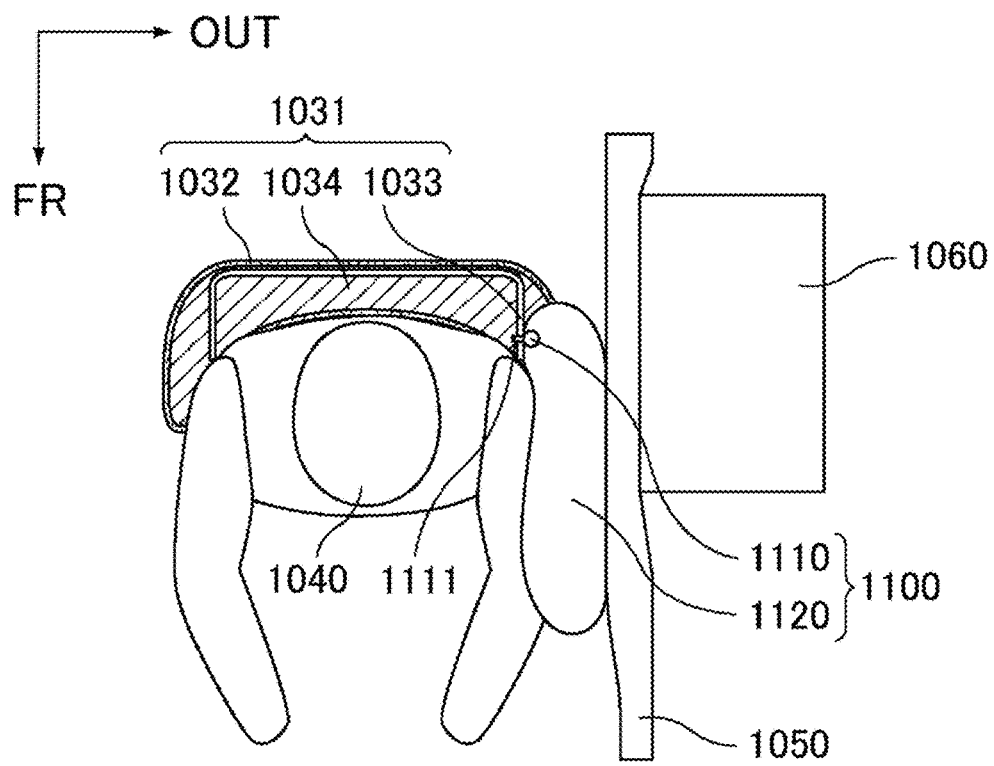
FIG. 2B is a schematic view illustrating the state, as viewed from an upper side, of the side airbag of the airbag device according to the first embodiment, after inflation and deployment.

FIG. 2A is a schematic view illustrating a state, as viewed from the lateral side, of the airbag of the airbag device according to the first embodiment, after inflation and deployment. In addition, FIG. 2B illustrates a state as viewed from an upper side.

When the vehicle gets into a side impact with an obstacle 1060 (for example, another vehicle) and the inflator 1110 is activated, gas generated from the inflator 1110 is introduced into the side airbag 1120, and the side airbag 1120 is inflated while being unfolded. When the cover 1032 of the seat back 1031 is ruptured by a force applied from the inflated side airbag 1120, the side airbag 1120 inflates and deploys (fully deploys) toward the vehicle side wall 1050 side of the occupant 1040, as illustrated in FIGS. 2A and 2B.

Figure 3:
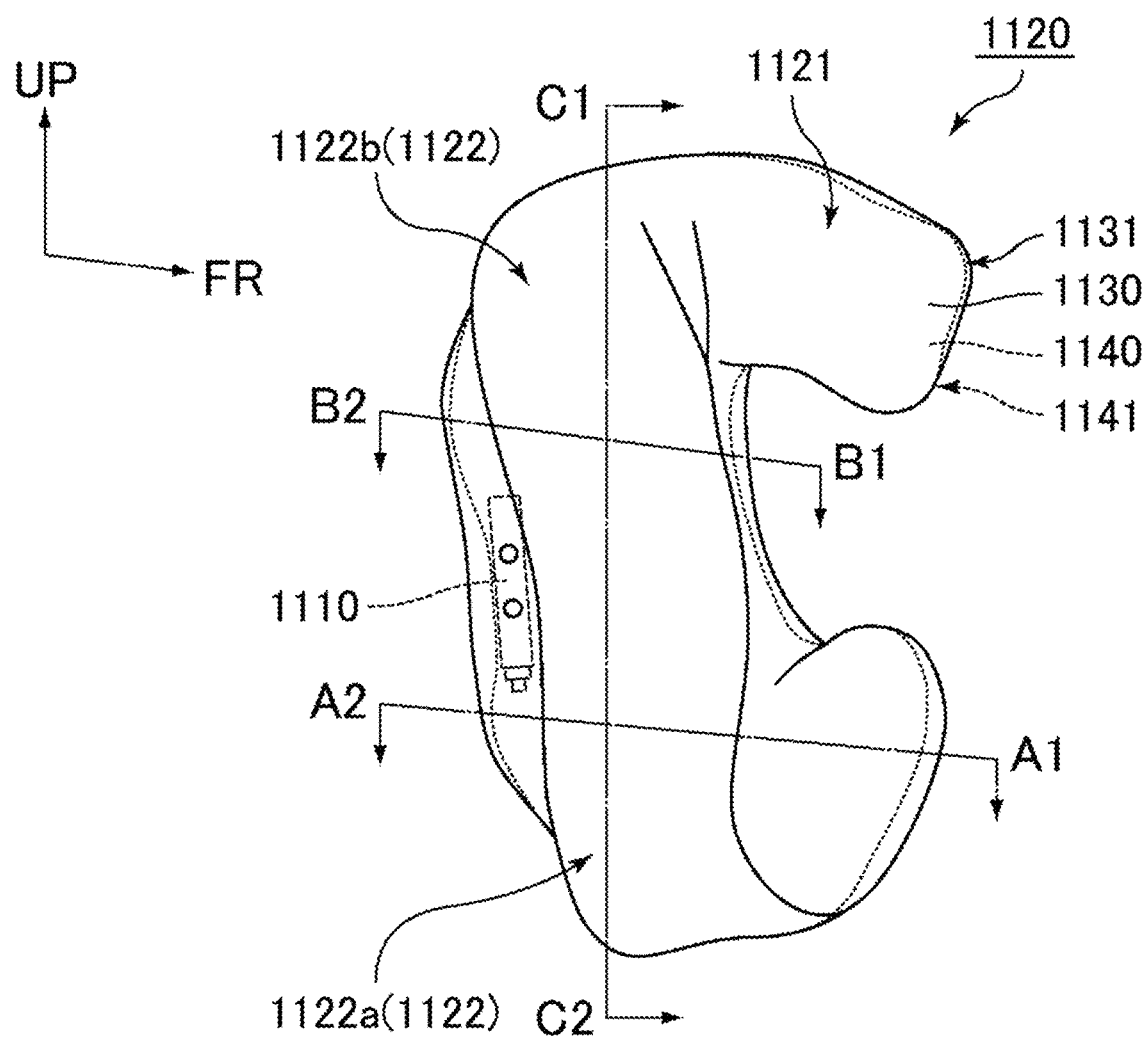
FIG. 3 is a view schematically illustrating a three-dimensional shape, as viewed from an occupant side, of the side airbag of the airbag device according to the first embodiment, after inflation and deployment.
Figure 4:
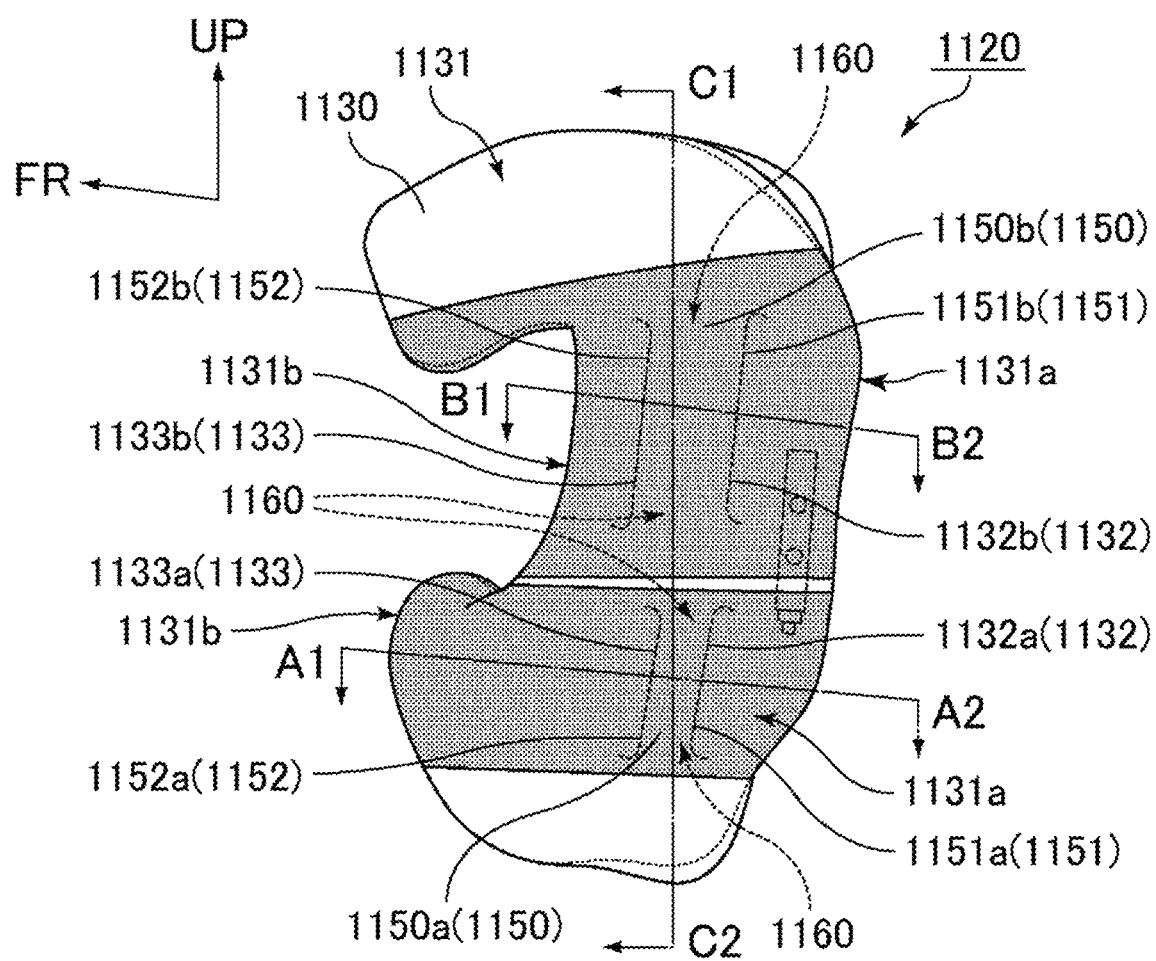
FIG. 4 is a view schematically illustrating the three-dimensional shape, as viewed from the lateral side, of the side airbag of the airbag device according to the first embodiment, after inflation and deployment, without illustrating a second panel on a vehicle outer side.
Figure 5:
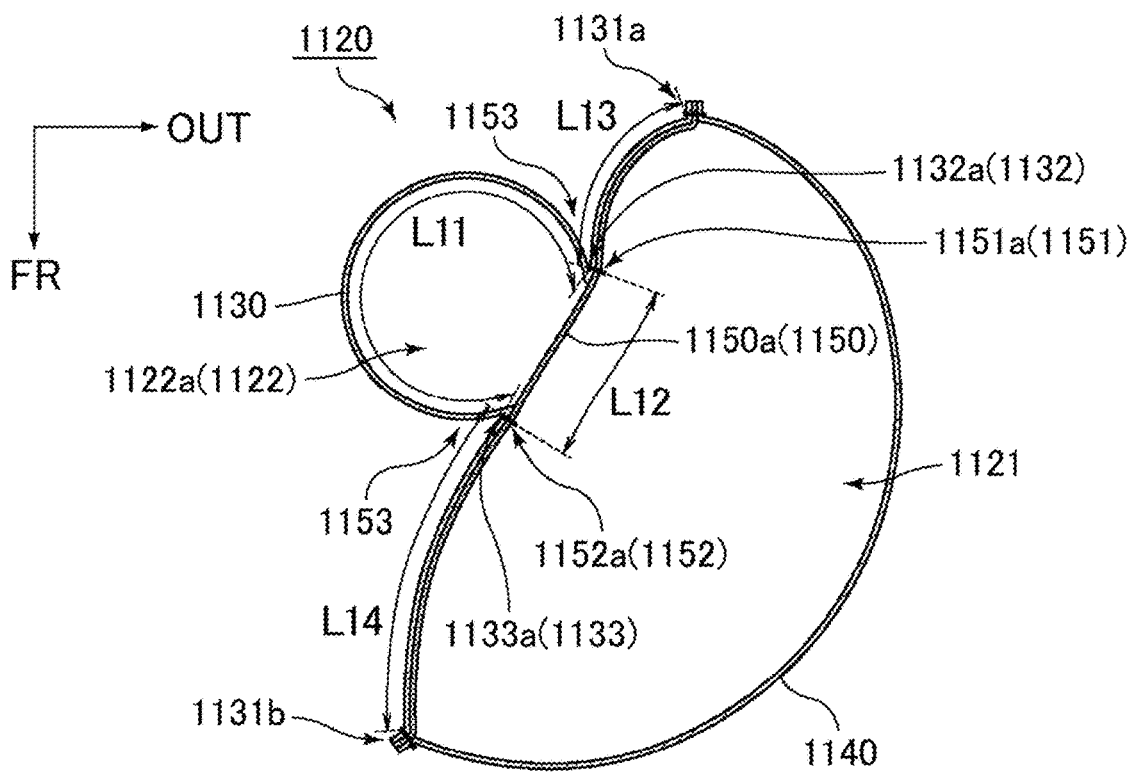
FIG. 5 is a schematic cross-sectional view illustrating a portion, as viewed from an upper side, corresponding to a line segment A1-A2 in FIGS. 3 and 4.
Figure 6:
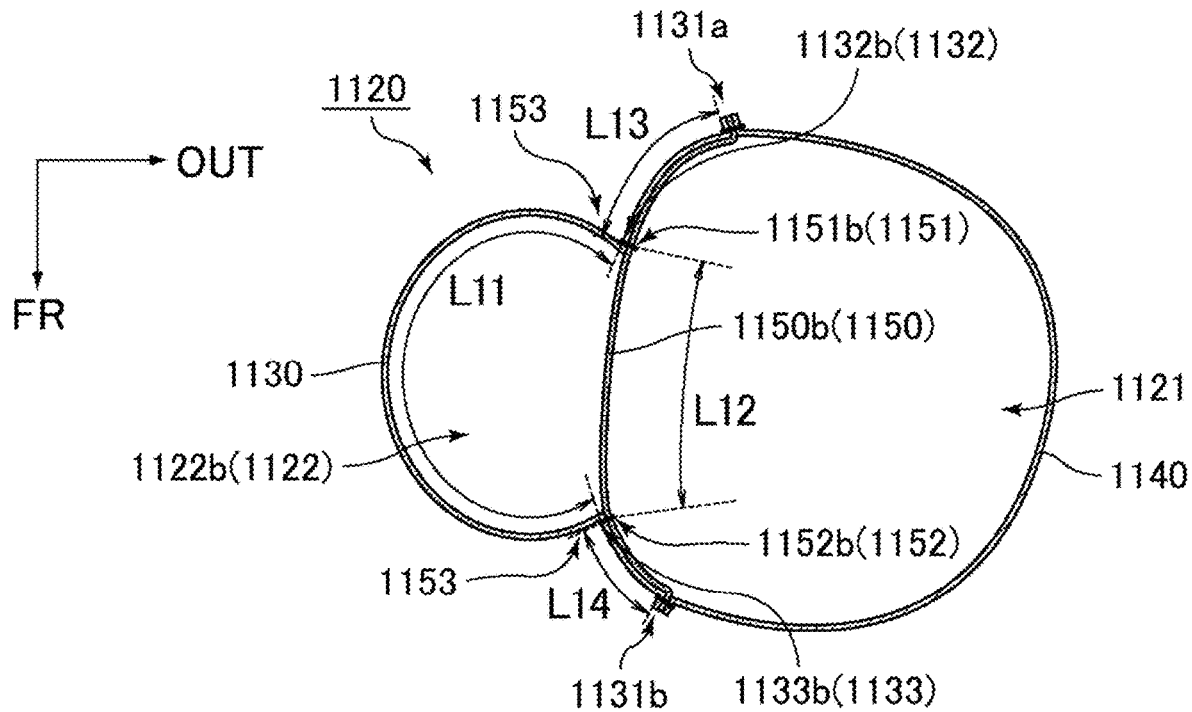
FIG. 6 is a schematic cross-sectional view illustrating a portion, as viewed from an upper side, corresponding to a line segment B1-B2 in FIGS. 3 and 4.
Figure 7:
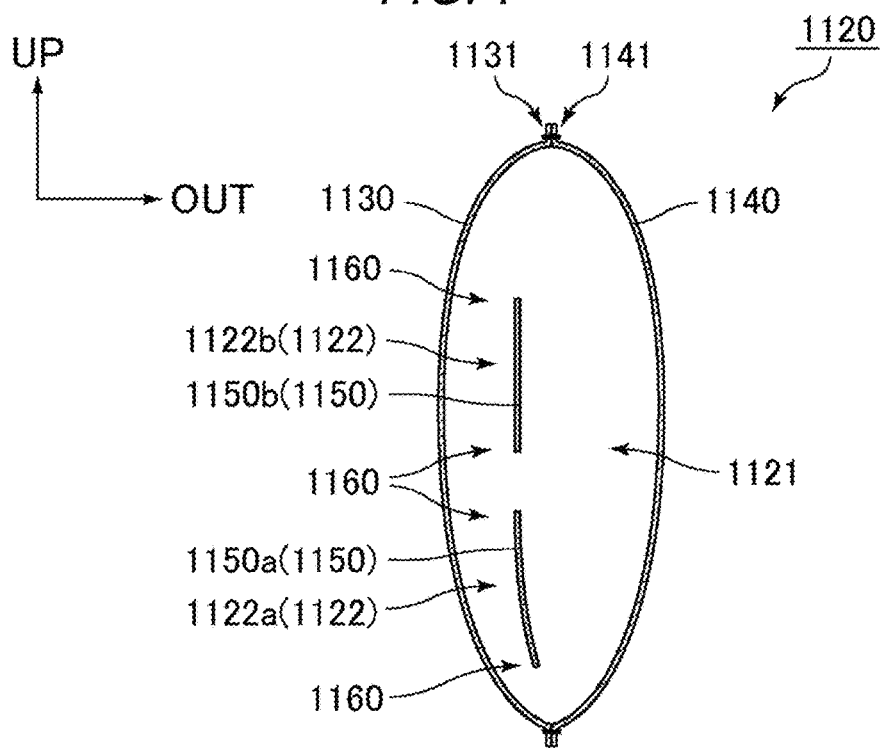
FIG. 7 is a schematic cross-sectional view illustrating a portion, as viewed from front, corresponding to a line segment C1-C2 in FIGS. 3 and 4.

FIGS. 3 and 4 are views schematically illustrating a three-dimensional shape of the side airbag of the airbag device according to the first embodiment after inflation and deployment. FIG. 3 illustrates a state as viewed from the occupant side, and FIG. 4 illustrates a state as viewed from the lateral side without illustrating a second panel on the vehicle outer side. FIG. 5 is a schematic cross-sectional view illustrating a portion, as viewed from an upper side, corresponding to a line segment A1-A2 in FIGS. 3 and 4. FIG. 6 is a schematic cross-sectional view illustrating a portion, as viewed from an upper side, corresponding to a line segment B1-B2 in FIGS. 3 and 4. FIG. 7 is a schematic cross-sectional view illustrating a portion, as viewed from front, corresponding to a line segment C1-C2 in FIGS. 3 and 4.

As illustrated in FIGS. 3 to 7, the side airbag 1120 includes a first panel 1130, a second panel 1140, a first regulating member 1150a, and a second regulating member 1150b.

The first panel 1130 includes an edge portion 1131, first fixing portions 1132a and 1132b which are portions different from the edge portion 1131, and second fixing portions 1133a and 1133b which are portions that are different from the edge portion 1131 and faces the first fixing portions 1132a and 1132b, respectively. Hereinafter, the first fixing portions 1132a and 1132b will be described as a first fixing portion 1132 when not distinguished from each other, and the second fixing portions 1133a and 1133b will be described as a second fixing portion 1133 when not distinguished from each other.

The first fixing portion 1132 and the second fixing portion 1133 are linear portions along a predetermined direction (hereinafter, referred to as an extending direction. Here, an up-down direction), and are located on an inside of the first panel 1130 relative to the edge portion 1131. In addition, the first fixing portion 1132 and the second fixing portion 1133 may be substantially parallel to each other as illustrated in FIG. 4, or may be non-parallel to each other, for example, a distance therebetween may gradually change. Further, the first fixing portion 1132 and the second fixing portion 1133 may have a linear shape as illustrated in FIG. 4, or at least one thereof may have a non-linear shape such as a curved shape (for example, arc shape), a zigzag shape, or a wavy shape.

As illustrated in FIGS. 4 to 6, the edge portion 1131 of the first panel 1130 includes a first edge portion 1131a located on an outer side of the first fixing portion 1132, and a second edge portion 1131b located on an outer side of the second fixing portion 1133. That is, the first edge portion 1131a, the first fixing portion 1132, the second fixing portion 1133, and the second edge portion 1131b are arranged in this order.

The second panel 1140 includes an edge portion 1141 coupled to the edge portion 1131 of the first panel 1130. The second panel 1140 defines the bag-shaped side airbag 1120 together with the first panel 1130. Each of the first panel 1130 and the second panel 1140 is formed of a single base cloth, and is formed in substantially the same shape, for example, a C shape such that the edge portion 1131 of the first panel 1130 coincides with the edge portion 1141 of the second panel 1140.

As illustrated in FIG. 2A, the side airbag 1120 is disposed corresponding to a position from the shoulder portion 1044 and the chest portion 1042 to the waist portion 1047 via the abdomen portion 1045 of the occupant 1040, in a state where the side airbag 1120 is inflated and deployed.

The first regulating member 1150a is provided inside the side airbag 1120, and includes a first portion 1151a fixed to the first fixing portion 1132a, and a second portion 1152a fixed to the second fixing portion 1133a. In addition, the second regulating member 1150b is provided inside the side airbag 1120, and includes a first portion 1151b fixed to the first fixing portion 1132b, and a second portion 1152b fixed to the second fixing portion 1133b. Hereinafter, the first regulating member 1150a and the second regulating member 1150b will be described as a regulating member 1150 when not distinguished from each other, the first portions 1151a and 1151b will be described as a first portion 1151 when not distinguished from each other, and the second portions 1152a and 1152b will be described as a second portion 1152 when not distinguished from each other.

The regulating member 1150 is a member provided to form a sub inflation portion 1122 to be described later, is provided only on one panel (here, the first panel 1130), and configured to regulate the first panel 1130 from completely inflating at the time of inflation and deployment. The regulating member 1150 is formed of a single band-shaped base cloth, and is coupled to the first panel 1130 at the first fixing portion 1132 and the second fixing portion 1133. The first portion 1151 of the regulating member 1150 and the first fixing portion 1132 of the first panel 1130 are located at the same position on the side airbag 1120. The second portion 1152 of the regulating member 1150 and the second fixing portion 1133 of the first panel 1130 are located at the same position on the side airbag 1120. The first regulating member 1150a is provided such that, in the state where the side airbag 1120 is inflated and deployed, a first sub inflation portion 1122a to be described later is disposed at a position corresponding to the waist portion 47 of the occupant 1040. In addition, the second regulating member 1150b is provided such that, in the state where the side airbag 1120 is inflated and deployed, a second sub inflation portion 1122b to be described later is disposed at a position corresponding to a front portion of a trunk of the occupant 1040.

As illustrated in FIGS. 4 and 7, the regulating member 1150 is not fixed to the first panel 1130 on a lateral side, which is an extending direction of the first portion 1151 and the second portion 1152 and an opposite direction to the extending direction (here, the up-down direction), with respect to a direction in which the first portion 1151 and the second portion 1152 face each other, and openings 1160 are respectively provided in portions where the regulating member 1150 is not fixed to the first panel 1130. Gas from the inflator 1110 is allowed to flow, through the openings 1160, between a main bag 1121 to be described later and the sub inflation portion 1122.

As illustrated in FIG. 4, the regulating member 1150 may be fixed to the first fixing portion 1132 and the second fixing portion 1133 at an intermediate portion excluding end portions thereof, or may include one end fixed to the first fixing portion 1132 and the other end fixed to the second fixing portion 1133. In the former case, the one end and the other end of the regulating member 1150 may extend to the edge portion 1131 of the first panel 1130 and the edge portion 1141 of the second panel 1140, and may be coupled to both the edge portions 1131 and 1141.

As illustrated in FIGS. 5 and 6, a length L11 from the first fixing portion 1132 to the second fixing portion 1133 of the first panel 1130 is longer than a length L12 from the first portion 1151 to the second portion 1152 of the regulating member 1150. In the present description, the "length from the first fixing portion to the second fixing portion of the first panel" and the "length from the first portion to the second portion of the regulating member" mean lengths each measured in a state where a cross section (for example, cross sections in FIGS. 5 and 6) passing through any first point (which may be a point on each site of the first fixing portion) on the first fixing portion and a second point located at a shortest distance from the first point on the second fixing portion is viewed.

As a result, in a state where the regulating member 1150 is made flat at a stage before inflation, a portion from the first fixing portion 1132 to the second fixing portion 1133 of the first panel 1130 becomes slack. In other words, at the stage before inflation, the regulating member 1150 is fixed to the first fixing portion 1132 and the second fixing portion 1133 in a state where the portion from the first fixing portion 1132 to the second fixing portion 1133 of the first panel 1130 is slackened.

The side airbag 1120 includes: a main bag 1121 defined by the first panel 1130 excluding a portion between the first fixing portion 1132 and the second fixing portion 1133, the second panel 1140, and the regulating member 1150; a first sub inflation portion 1122a defined by the first panel 1130 between the first fixing portion 1132a and the second fixing portion 1133a, and the first regulating member 1150a; and a second sub inflation portion 1122b defined by the first panel 1130 between the first fixing portion 1132b and the second fixing portion 1133b, and the second regulating member 1150b. Hereinafter, the first sub inflation portion 1122a and the second sub inflation portion 1122b will be described as the sub inflation portion 1122 when not distinguished from each other.

The main bag 1121 is a chamber configuring a main portion of the side airbag 1120, and mainly has a basic function of the side airbag 1120 of protecting the occupant 1040 by being inflated and deployed between the vehicle side wall 1050 and the occupant 1040 seated in the seat. As illustrated in FIG. 2A, the main bag 1121 is disposed corresponding to a position from the shoulder portion 1044 and the chest portion 1042 to the waist portion 1047 via the abdomen portion 1045 of the occupant 1040, similarly to the entire side airbag 1120.

The sub inflation portion 1122 is a chamber having a smaller capacity than that of the main bag 1121 provided on an occupant 1040 side of the main bag 1121. The sub inflation portion 1122 is configured to be inflated and deployed between the main bag 1121 and the occupant 1040 seated in the seat to protect the occupant 1040, and has an additional function of the side airbag 1120 of mitigating an impact applied to the occupant 1040 in the state where the side airbag 1120 is inflated and deployed. As illustrated in FIG. 2A, in the state where the side airbag 1120 is inflated and deployed, the first sub inflation portion 1122a is disposed at a position corresponding to the waist portion 1047 of the occupant 1040, and the second sub inflation portion 1122b is disposed at a position corresponding to the front portion of the trunk of the occupant 1040. Here, the trunk of the occupant 1040 is a portion including the chest portion 1042, the abdomen portion 1045, and the back portion 1046 of the occupant 1040. The front portion of the trunk refers to the chest portion 1042 and the abdomen portion 1045. That is, the second sub inflation portion 1122b is disposed at a position corresponding to at least one of the chest portion 1042 or the abdomen portion 1045 of the occupant 1040.

In the state where the side airbag 1120 is inflated and deployed, the inflator 1110 is configured to introduce gas into the main bag 1121, the first panel 1130 is configured to face the occupant 1040, and the sub inflation portion 1122 is configured to receive the occupant 1040.

More specifically, the inflator 1110 is provided in the main bag 1121, and the gas ejected from the inflator 1110 flows out into the main bag 1121 and then flows into the sub inflation portion 1122 from the main bag 1121 through the openings 1160. In the present embodiment, the first sub inflation portion 1122a is configured to receive a side surface of the waist portion 1047 of the occupant 1040, and the second sub inflation portion 1122b is configured to receive a side surface of the front portion (chest portion 1042 and/or abdomen portion 1045) of the trunk of the occupant 1040.

A manufacturing process of the side airbag 1120 is not particularly limited, and for example, the side airbag 1120 can be manufactured by a process illustrated in FIGS. 8 to 11.

Figure 8:
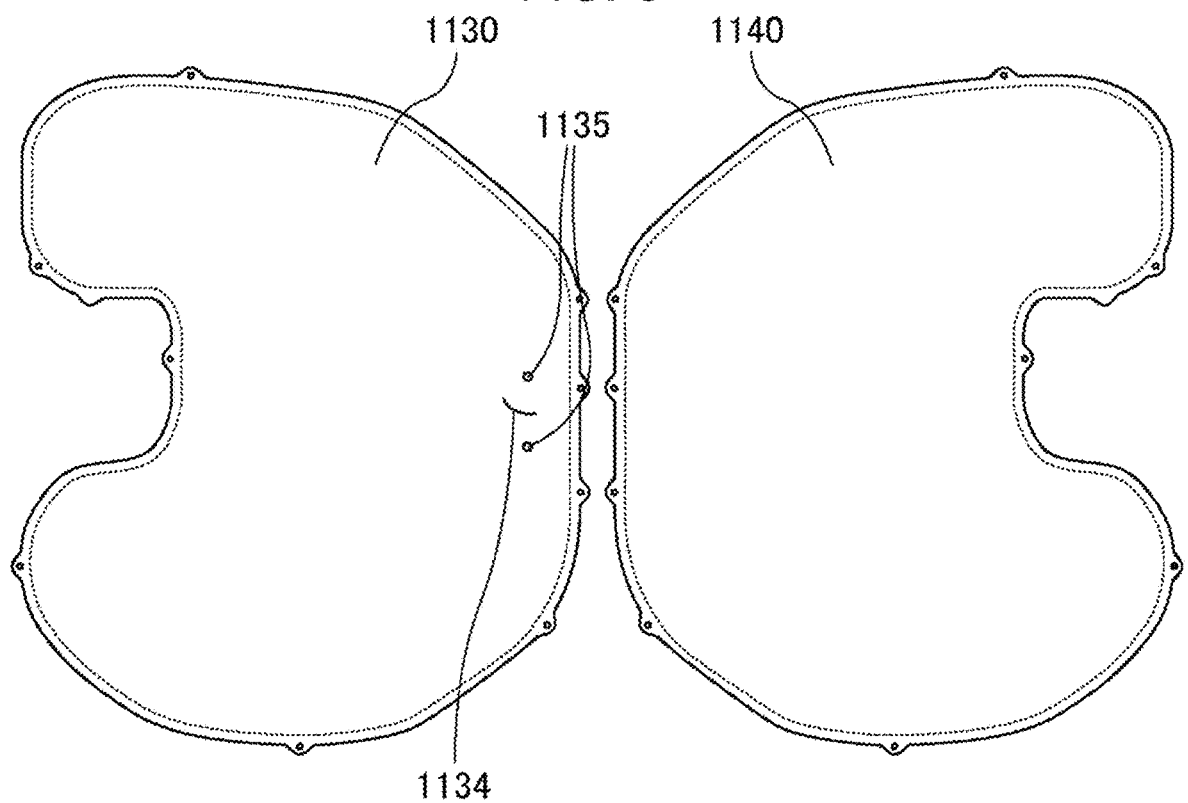
FIG. 8 is a schematic plan view illustrating a first panel and the second panel of the airbag device according to the first embodiment.

First, as illustrated in FIG. 8, the first panel 1130 and the second panel 1140 are each cut out from a base cloth. The first panel 1130 is formed with a slit 1134 for inserting the inflator 1110 into the side airbag 1120, and a pair of holes 1135 for inserting the pair of bolts 1111. The second panel 1140 is the same as the first panel 1130 except that the slit 1134 and the pair of holes 1135 are not formed in the second panel 1140.

Figure 9:
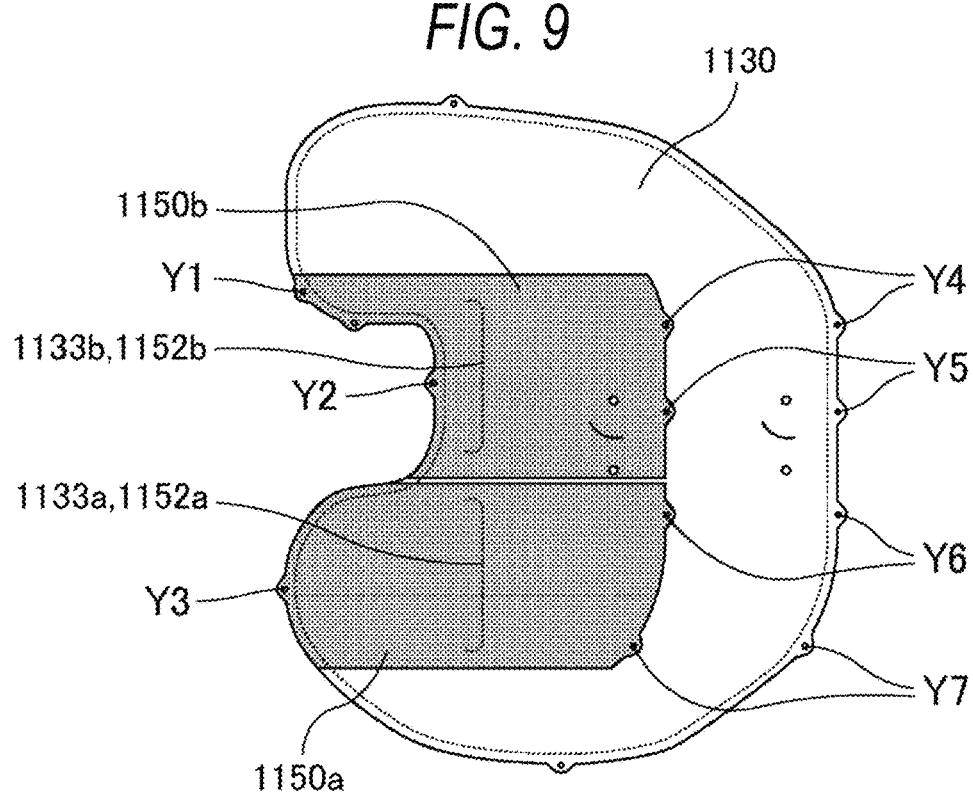
FIG. 9 is a schematic plan view illustrating a state where a first regulating member and a second regulating member are coupled to a second fixing portion of the first panel of the airbag device according to the first embodiment.

Next, the first regulating member 1150a and the second regulating member 1150b are each cut out from the base cloth. As illustrated in FIG. 9, the second portion 1152b of the second regulating member 1150b is coupled to the second fixing portion 1133b of the first panel 1130 such that marks Y1 correspond to each other and marks Y2 correspond to each other, and the second portion 1152a of the first regulating member 1150a is coupled to the second fixing portion 1133a of the first panel 1130 such that marks Y3 correspond to each other.

Figure 10:
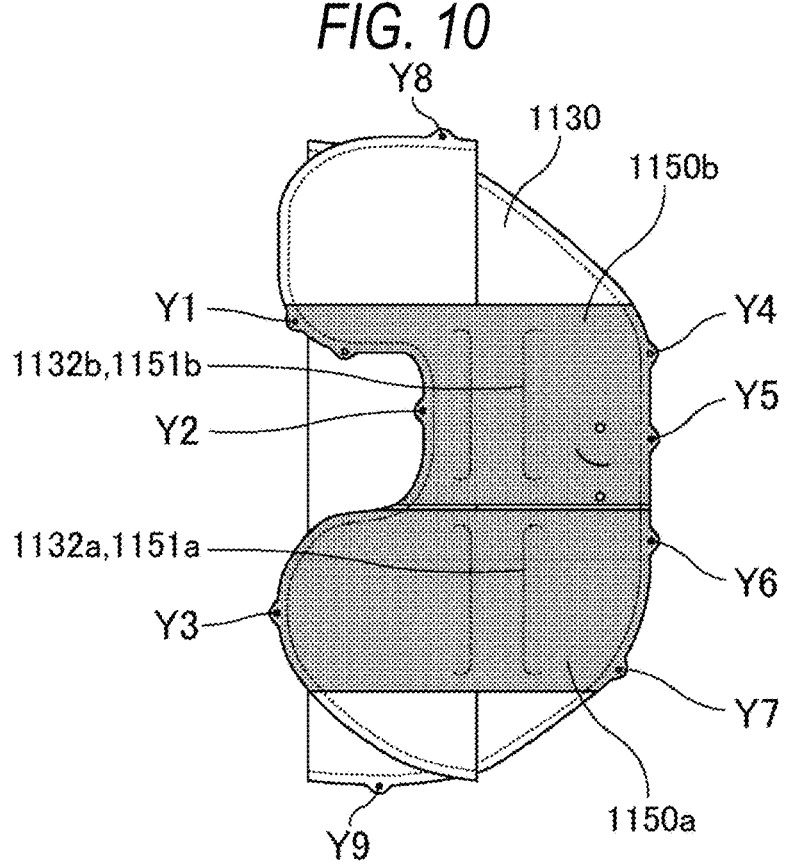
FIG. 10 is a schematic plan view illustrating a state where the first regulating member and the second regulating member are coupled to a first fixing portion of the first panel of the airbag device according to the first embodiment.

Next, as illustrated in FIG. 10, in a state where the first panel 1130 is folded and contracted at a central portion, the first portion 1151b of the second regulating member 1150b is coupled to the first fixing portion 1132b of the first panel 1130 such that marks Y4 correspond to each other and marks Y5 correspond to each other, and the first portion 1151a of the first regulating member 1150a is coupled to the first fixing portion 1132a of the first panel 1130 such that marks Y6 correspond to each other and marks Y7 correspond to each other. Thus, the first regulating member 1150a and the second regulating member 1150b are attached to the first panel 1130.

Figure 11:
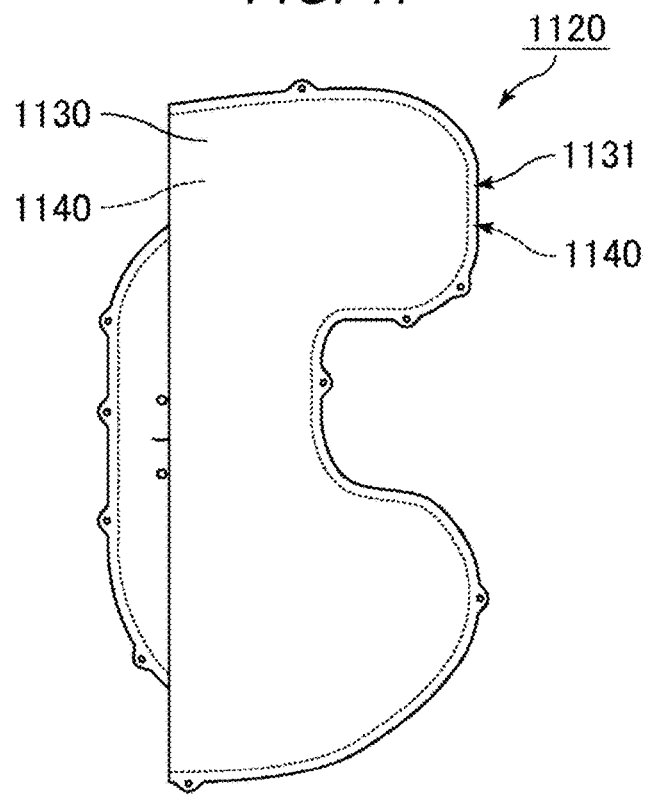
FIG. 11 is a schematic plan view illustrating a state where the second panel is coupled to the first panel of the airbag device according to the first embodiment.

Then, by overlapping and coupling the pair of edge portions 1131 and 1141 of the first panel 1130 and the second panel 1140 such that the marks Y1 to Y9 each correspond to each other, the bag-shaped side airbag 1120 can be manufactured as illustrated in FIG. 11. In this case, the one end and the other end of the regulating member 1150 may be overlapped and be coupled to the edge portions 1131 and 1141.

Examples of a method for the above-mentioned coupling include sewing, adhesion, and welding, and sewing is particularly preferable method.

The base cloth used for the first panel 1130, the second panel 1140, and the regulating member 1150 can be formed of, for example, a thread such as nylon 66 or polyethylene terephthalate (PET). In addition, in order to improve heat resistance, air tightness, or the like, the base cloth may have a surface coated with silicon or the like.

Figure 12:
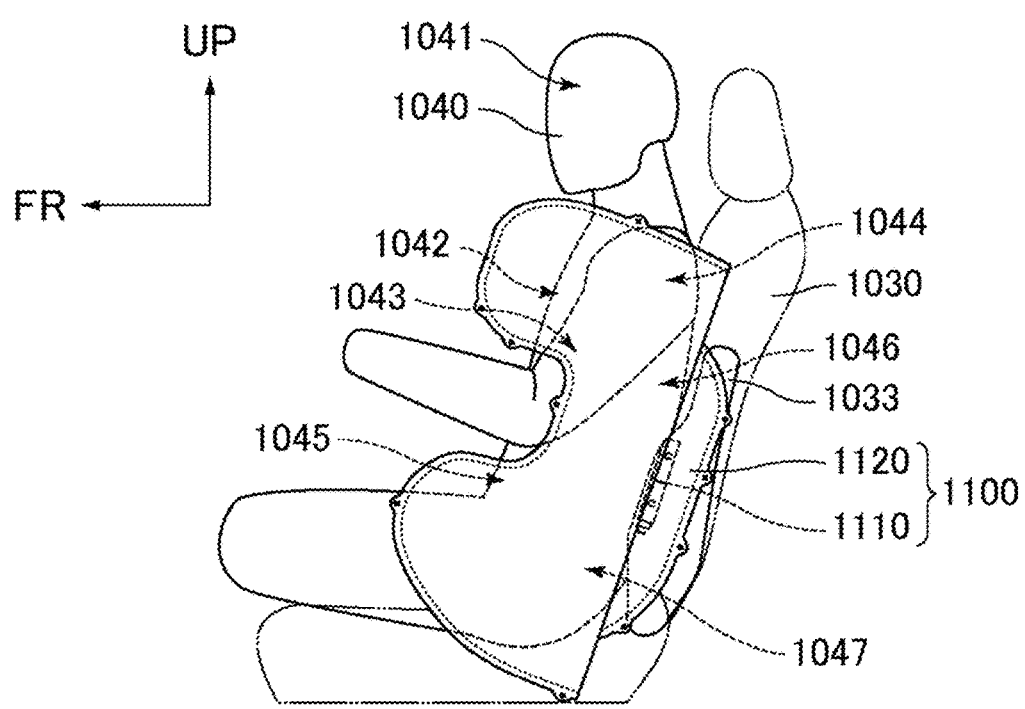
FIG. 12 is a schematic view illustrating, together with an occupant, a state where the side airbag of the airbag device according to the first embodiment, before inflation is deployed, as viewed from the lateral side.

FIG. 12 is a schematic view illustrating the airbag device according to the first embodiment as viewed from the lateral side, together with the occupant, in a state where the side airbag before inflation is deployed.

As illustrated in FIG. 12, even at a stage before inflation, similarly to the time of inflation and deployment, the side airbag 1120 corresponds to a position from the shoulder portion 1044 and the chest portion 1042 to the waist portion 1047 via the abdomen portion 1045 of the occupant 1040.

As described above, in the present embodiment, the length L11 from the first fixing portion 1132 to the second fixing portion 1133 of the first panel 1130 that forms the sub inflation portion 1122 is longer than the length L12 from the first portion 1151 to the second portion 1152 of the regulating member. As a result, in the side airbag 1120 formed in a bag shape by coupling the pair of edge portions 1131 and 1141 of the first panel 1130 and the second panel 1140, as for the main bag 1121 and the sub inflation portion 1122 separated by the regulating member 1150, the main bag 1121 is larger than the sub inflation portion 1122, and a reaction force of the side airbag 1120 generated due to an internal pressure is also larger in the main bag 1121 than in the sub inflation portion 1122. Therefore, the sub inflation portion 1122 is softer than the main bag 1121. In addition, due to a difference in size between the main bag 1121 and the sub inflation portion 1122, a tension generated on a surface of the second panel 1140 forming the main bag 1121 by the inflation of the side airbag 1120 is also larger than that of the first panel 1130.

In a state where the airbag device 1100 is activated and gas is generated from the inflator 1110, the gas is introduced from the inflator 1110 into the main bag 1121, and the main bag 1121 is inflated and deployed. In this state, in the side airbag 1120, since a portion where the regulating member 1150 is provided is inflated and deployed, the sub inflation portion 1122 is also deployed, and the gas flows in between the first panel 1130 and the regulating member 1150, that is, the gas flows in the openings 1160, to inflate the sub inflation portion 1122. In this case, in a case where the main bag 1121, in which a high reaction force is generated due to the tension and the internal pressure generated in the second panel 1140, comes into contact with the vehicle, the side airbag 1120 moves toward the occupant 1040 side by the reaction force. As a result, the sub inflation portion 1122 is configured to quickly come into contact with the occupant 1040, and the soft sub inflation portion 1122 defined by a part of the first panel 1130 is configured to be interposed between the hard main bag 1121 and the occupant 1040 and to receive the occupant 1040 in a gentle manner. Preferably, the side surface of the front portion (chest portion 1042 and/or abdomen portion 1045) of the trunk of the occupant 1040 can be received by the second sub inflation portion 1122*b* in a gentle manner.

In addition, as described above, since the main bag 1121 having a high reaction force is inflated and deployed between the vehicle and the occupant 1040 and the side airbag 1120 moves toward the occupant 1040 side, the contact with the occupant 1040 can be accelerated, and the occupant 1040 can be protected by the soft sub inflation portion 1122. Therefore, the occupant 1040 can be safely protected at an early stage without harm the occupant 1040.

Further, at the time of manufacturing the side airbag 1120, after the regulating member 1150 is attached to the first panel 1130, the pair of edge portions 1131 and 1141 of the first panel 1130 and the second panel 1140 may be overlapped and coupled, so that the side airbag 1120 can be easily manufactured.

In addition, by providing the second regulating member 1150*b* at a rear portion (a position corresponding to the waist portion 1047 of the occupant 1040) of the side airbag 1120, the front portion of the side airbag 1120 can be bent and brought close to the occupant, and the occupant 1040 can be restrained (protected) at an early stage.

In the present embodiment, as illustrated in FIGS. 5 and 6, it is preferable that a constriction 1153 is provided, by the regulating member 1150, between the main bag 1121 and the sub inflation portion 1122. As a result, the sub inflation portion 1122 is configured to be inclined (swung) with respect to the main bag 1121 considering the constriction 1153 as a starting point. Therefore, even in a case where the main bag 1121 moves after the occupant 1040 is received by the sub inflation portion 1122, the sub inflation portion 1122 can continuously receive the occupant 1040. In this way, it is preferable that the sub inflation portion 1122 is inflated more largely than a portion from the first portion 1151 to the second portion 1152 of the regulating member 1150.

In addition, the sub inflation portion 1122 tend to be roundly inflated depending on the internal pressure of the side airbag 1120, and in the present embodiment, as illustrated in FIGS. 5 and 6, the length L11 from the first fixing portion 1132 to the second fixing portion 1133 of the first panel 1130 is preferably longer than R/2 times the length L12 (that is, $L12 \times \pi/2$) from the first portion 1151 to the second portion 1152 of the regulating member 1150. That is, the length L11 is preferably longer than half a length of a circumference having the length L12 as a diameter. As a result, since a maximum width of the sub inflation portion 1122 is larger than the length from the first portion 1151 to the second portion 1152 of the regulating member 1150, the constriction 1153 can be effectively formed.

An upper limit of a ratio (L11/L12) of the length L11 to the length L12 is not particularly limited, and the length L12 is preferably a length that allows gas to flow from the openings 1160 to the sub inflation portion 1122.

In the present embodiment, as illustrated in FIG. 5, the length L12 from the first portion 1151*a* to the second portion 1152*a* of the first regulating member 1150*a* is preferably shorter than a length L13 from the first fixing portion 1132*a* to the first edge portion 1131*a* of the first panel 1130, and is preferably shorter than a length L14 from the second fixing portion 1133*a* to the second edge portion 1131*b* of the first panel 1130. As a result, a thickness of the main bag 1121 can be increased. Therefore, it is possible to gain a stroke in a case where the side airbag 1120 is pressed by the vehicle.

Here, the "length from the first fixing portion to the first edge portion of the first panel" and the "length from the second fixing portion to the second edge portion of the first panel" mean lengths each measured in a state where a cross section (for example, the cross section in FIG. 5) passing through any first point (which may be a point on each site of the first fixing portion) on the first fixing portion and a second point located at a shortest distance from the first point on the second fixing portion is viewed.

A ratio (L12/L13) of the length L12 to the length L13, and a ratio (L12/L14) of the length L12 to the length L14 are not particularly limited.

In the present embodiment, as illustrated in FIG. 5, the length L14 from the second fixing portion 1133*a* to the second edge portion 1131*b* of the first panel 1130 is preferably longer than the length L13 from the first fixing portion 1132*a* to the first edge portion 1131*a* of the first panel 1130. That is, a location of the sub inflation portion 1122*a* is preferably closer to the first edge portion 1131*a* than to the second edge portion 1131*b*. As a result, as illustrated in FIG. 5, the front portion of the side airbag 1120 on a second edge portion 1131*b* side is bent toward the occupant 1040 side. Therefore, an inflation and deployment position of a part of the side airbag 1120 can be adjusted according to a distance to the occupant 1040 and a body shape of the occupant 1040.

In the present embodiment, as illustrated in FIG. 6, although a position of the sub inflation portion 1122*b* is closer to the second edge portion 1131*b* than to the first edge portion 1131*a*, since the inflator 1110 is fixed between the sub inflation portion 1122*b* and the first edge portion 1131*a*, the rear portion of the side airbag 1120 on a first edge portion 1131*a* side is not bent toward the occupant 1040 side.

Hereinafter, modifications of the present embodiment will be described.

Figure 13:
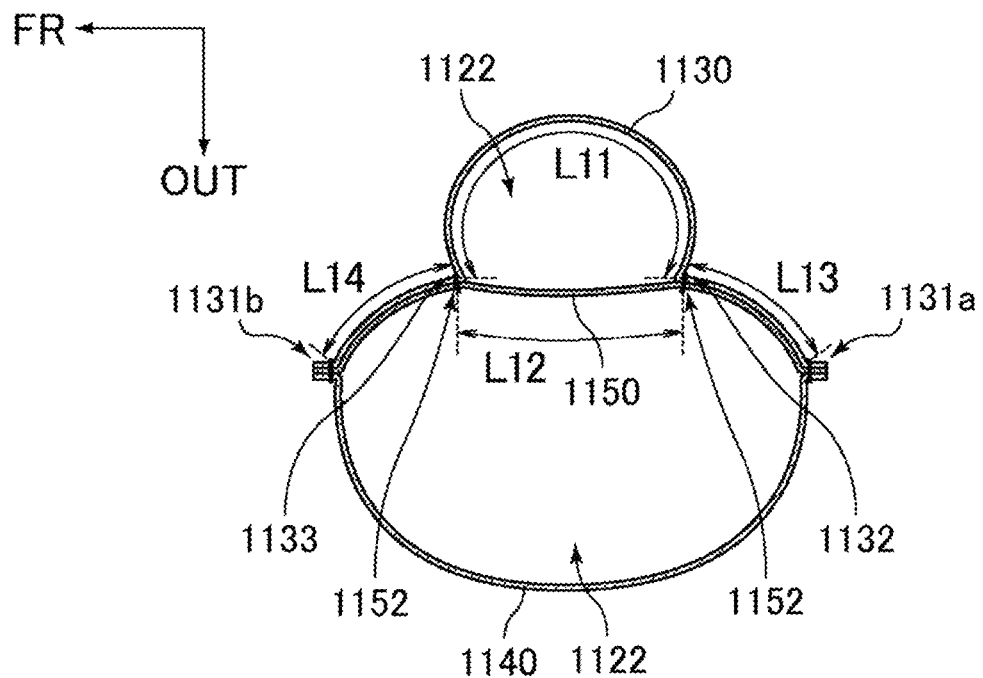
FIG. 13 is a schematic cross-sectional view illustrating a state of the side airbag, in a portion where a sub inflation portion is provided, of an airbag device according to a first modification of the first embodiment, after inflation and deployment, as viewed from an upper side.
Figure 14:
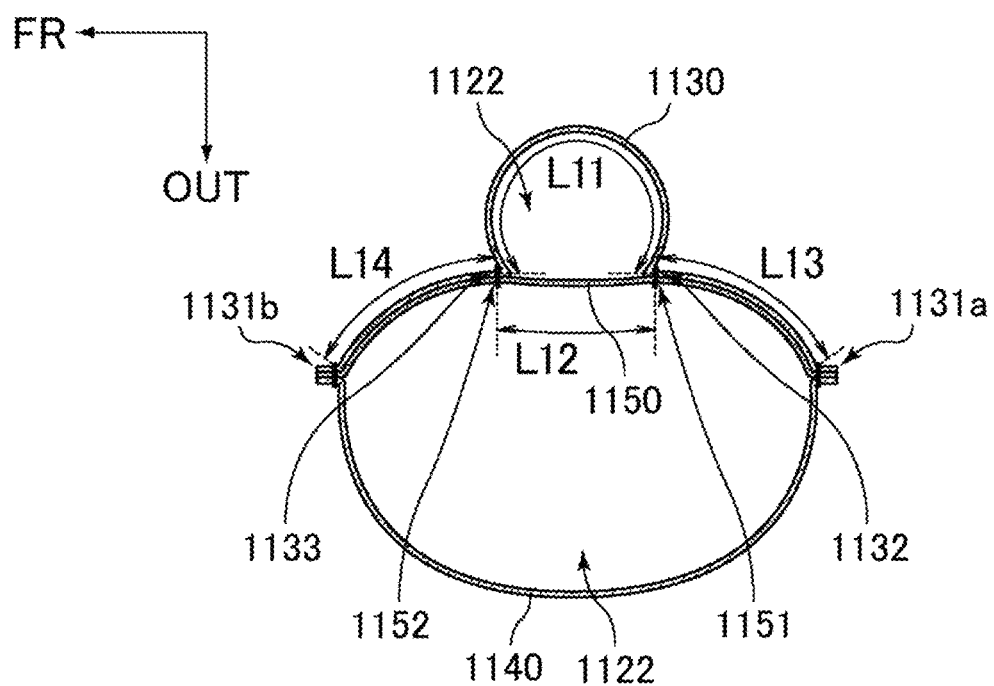
FIG. 14 is a schematic cross-sectional view illustrating a state of the side airbag, in a portion where a sub inflation portion is provided, of an airbag device according to a second modification of the first embodiment, after inflation and deployment, as viewed from an upper side.

FIGS. 13 and 14 are schematic cross-sectional views each illustrating a state, as viewed from an upper side, of the side airbag in a portion where a sub inflation portion is provided, in airbag devices according to first and second modifications of the first embodiment, after inflation and deployment.

As illustrated in FIGS. 13 and 14, the length L14 from the second fixing portion 1133 to the second edge portion 1131*b* of the first panel 1130 may be substantially the same as the length L13 from the first fixing portion 1132 to the first edge portion 1131*a* of the first panel 1130. That is, the sub inflation portion 1122 may be located at a center between the first edge portion 1131*a* and the second edge portion 1131*b*.

As illustrated in FIG. 13, the length L12 from the first portion 1151 to the second portion 1152 of the regulating member 1150 may be longer than the length L13 from the first fixing portion 1132 to the first edge portion 1131*a* of the first panel 1130, and longer than the length L14 from the second fixing portion 1133 to the second edge portion 1131*b* of the first panel 1130.

In the present embodiment, at least one of the first regulating member 1150*a* or the second regulating member 1150*b* may be provided with at least one (for example, one) gas flow hole through which gas can flow.

In the present embodiment, the extending direction along which the first fixing portion 1132 and the second fixing portion 1133 extend is not particularly limited, and may be, for example, a front-rear direction or an oblique direction intersecting the up-down direction and the front-rear direction.

In the present embodiment, it is preferable that at least one of the first panel 1130 or the second panel 1140 is provided with at least one (for example, one) of vent holes for discharging gas. In a case where the inflated and deployed side airbag 1120 is pressed, the internal pressure increases, and the reaction force of the side airbag 1120 increases. That is, although the side airbag 1120 becomes hard, absorption characteristics of the side airbag 1120 can be controlled by appropriately discharging the gas from the vent holes.

In addition, in the present embodiment, the side airbag 1120 may be disposed corresponding to the position from the head portion 1041 and the chest portion 1042 to the waist portion 1047 via the abdomen portion 1045 of the occupant 1040, the head portion 1041 may be protected by the sub inflation portion 1122, and the number of the sub inflation portion 1122 per one side airbag 1120 is not particularly limited, and may be, for example, one, or three or more.

Second Embodiment

Hereinafter, an airbag device according to a second embodiment will be described with reference to the drawings. The side airbag device according to the second embodiment is the same as the airbag device according to the first embodiment except that the airbag to which a sub inflation portion is to be provided is different. In the present embodiment, the sub inflation portion is provided in a curtain airbag.

Figure 15:
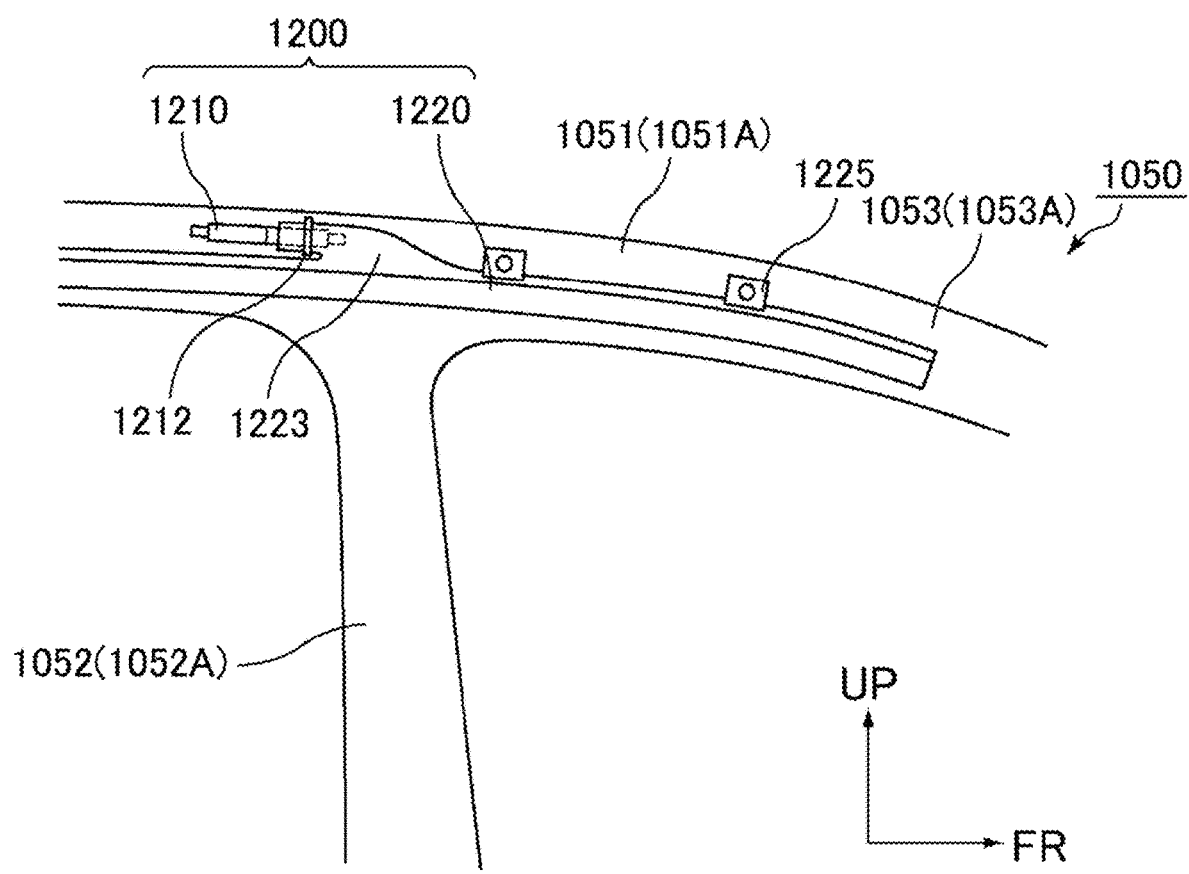
FIG. 15 is a schematic view, which is a front view of a vehicle side wall as viewed from a vehicle interior side, illustrating a state of a curtain airbag of an airbag device according to a second embodiment, after inflation and deployment.

FIG. 15 is a schematic view, which is a front view of a vehicle side wall as viewed from a vehicle interior side, illustrating a state of a curtain airbag of an airbag device according to the second embodiment, before inflation and deployment.

The airbag device 1200 is a curtain airbag device, and is covered with an interior material and stored on an upper side of a vehicle side wall 1050 of the vehicle. The airbag device 1200 is stored in a space (a storage portion of the vehicle side wall 1050) formed between the vehicle side wall 1050 and the interior material so as not to be visually recognized by an occupant in the vehicle, but in FIG. 15, for convenience of explanation, the airbag device 1200 is illustrated in a specialized manner.

The vehicle side wall 1050 is not particularly limited as long as the vehicle side wall 1050 is a vehicle body portion located on a lateral side of the occupant seated in a seat, and is a collective name for a side door, a pillar, a side window, and the like. Examples of the vehicle side wall 1050 include a roof side rail 1051 at an upper side of the vehicle, a front pillar (pillar A) 1053 at a front side of the vehicle, a center pillar (pillar B) 1052 at a center of the vehicle, and a rear pillar (pillar C) (not illustrated) at a rear side of the vehicle. In FIG. 15, illustrations of a vehicle front portion, a vehicle rear portion, and a vehicle lower portion of the vehicle side wall 1050 are omitted.

The interior material is not particularly limited as long as the interior material is a member covering the vehicle side wall 1050. Examples of the interior material include a ceiling material 1051A covering the roof side rail 1051, a front pillar trim 1053A covering the front pillar, a center pillar trim 1052A covering the center pillar 1052, and a rear pillar trim (not illustrated) covering the rear pillar.

The airbag device 1200 has an inflator 1210 configured to generate gas and a curtain airbag 1220.

The inflator 1210 is a cylindrical (columnar) gas generator, and includes a gas ejection hole at one end in a longitudinal direction of the vehicle. The gas ejection hole is inserted into a gas introduction portion 1223, of the curtain airbag 1220, sewed in a tubular shape to be formed.

Similarly to the case of the first embodiment, the inflator 1210 is activated in an emergency of the vehicle (for example, at the time of a side impact of the vehicle). Gas generated from the inflator 1210 is introduced into the curtain airbag 1220 from the gas ejection hole of the inflator 1210 through the gas introduction portion 1223 of the curtain airbag 1220.

A type of the inflator 1210 is not particularly limited, and examples thereof include those exemplified in the first embodiment.

The curtain airbag 1220 has the gas introduction portion 1223, into which the gas generated from the inflator 1210 is introduced. The gas introduction portion 1223 is fastened by a band 1212 together with the inserted inflator 1210 such that the gas generated from the inflator 1210 does not leak out. The inflator 1210 is attached to the roof side rail 1051, on an upper side of the center pillar 1052. On the other hand, the gas introduction portion 1223 is disposed at an upper edge (an upper end in a vehicle height direction) of the curtain airbag 1220. Since the gas introduction portion 1223 is disposed in the center of the vehicle or the vicinity of the center of the vehicle in the front-rear direction, a gas flow from the center of the vehicle or the vicinity of the center of the vehicle in the front-rear direction toward a front end and a gas flow from the center of the vehicle or the vicinity of the center of the vehicle in the front-rear direction toward a rear end are generated inner of the curtain airbag 1220.

The curtain airbag 1220 is a bag-shaped body, and before being inflated and deployed, the curtain airbag 1220 is disposed on the roof side rail 1051 and the front pillar 1053 along the longitudinal direction of the vehicle. The curtain airbag 1220 is folded up into a rod shape and stored in a state of being wound with a wrapping material or the like (not illustrated) configured to be ruptured at the time of inflation. In an emergency of the vehicle, the gas generated from the inflator 1210 is introduced into the curtain airbag 1220, and the curtain airbag 1220 is inflated and starts to be deployed from the folded up state. In a state where the interior material is pushed open by a force applied from the inflated curtain airbag 1220, the curtain airbag 1220 descends into a vehicle interior and further inflates, and inflates and deploys in a curtain shape from the upper side to the lower side of the vehicle side wall 1050. As a result, since the inflated and deployed curtain airbag 1220 covers the vehicle side wall 1050 from the vehicle interior side along the front-rear direction of the vehicle, the occupant 1040 in the vehicle is protected mainly the head portion 1041.

Next, a deployed state of the airbag device 1200 will be described below with reference to FIGS. 16 and 17.

Figure 16:
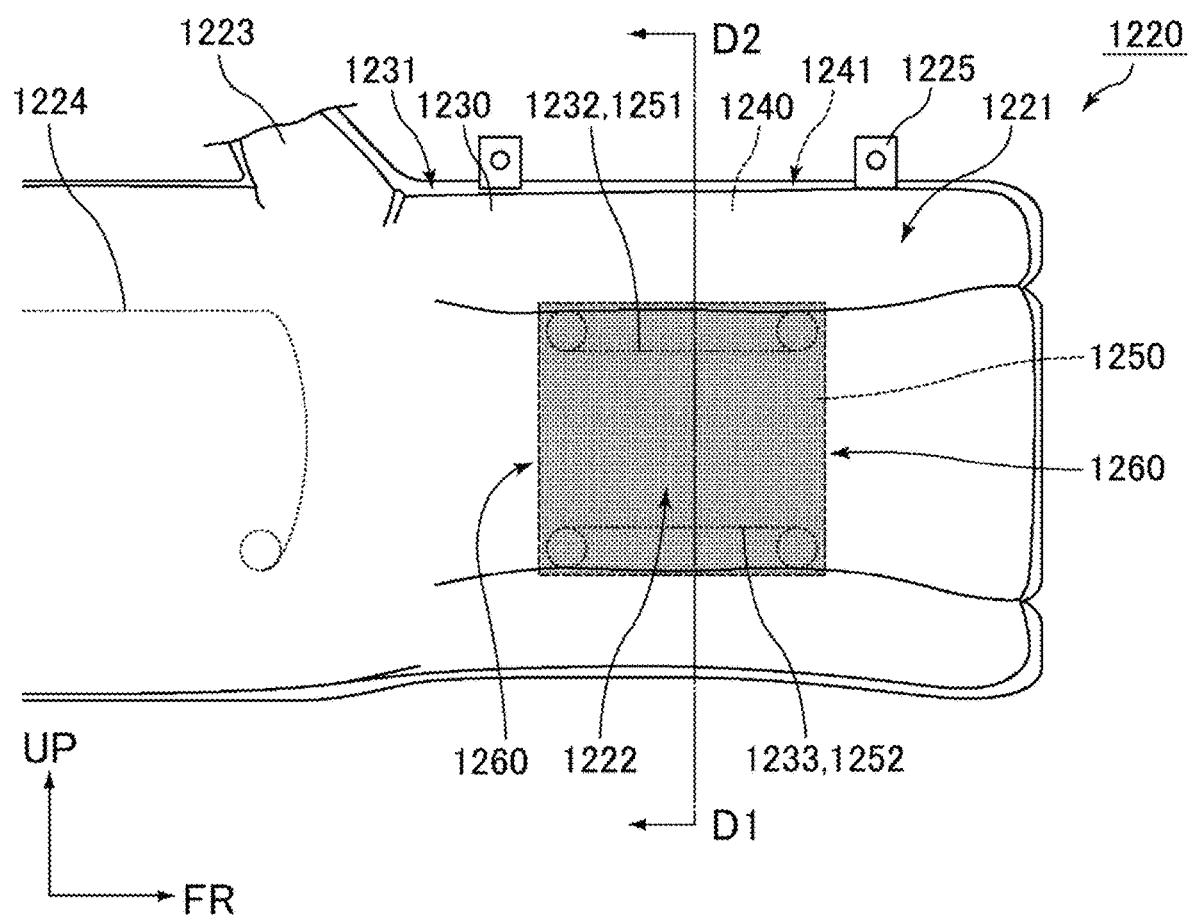
FIG. 16 is a view schematically illustrating a three-dimensional shape, as viewed from an occupant side, of the curtain airbag of the airbag device according to the second embodiment, after inflation and deployment.

FIG. 16 is a view schematically illustrating a three-dimensional shape, as viewed from the occupant side, of the curtain airbag of the airbag device according to the second embodiment, after inflation and deployment. FIG. 17 is a schematic cross-sectional view illustrating a portion, as viewed from front, corresponding to a line segment D1-D2 in FIG. 16.

Figure 17:
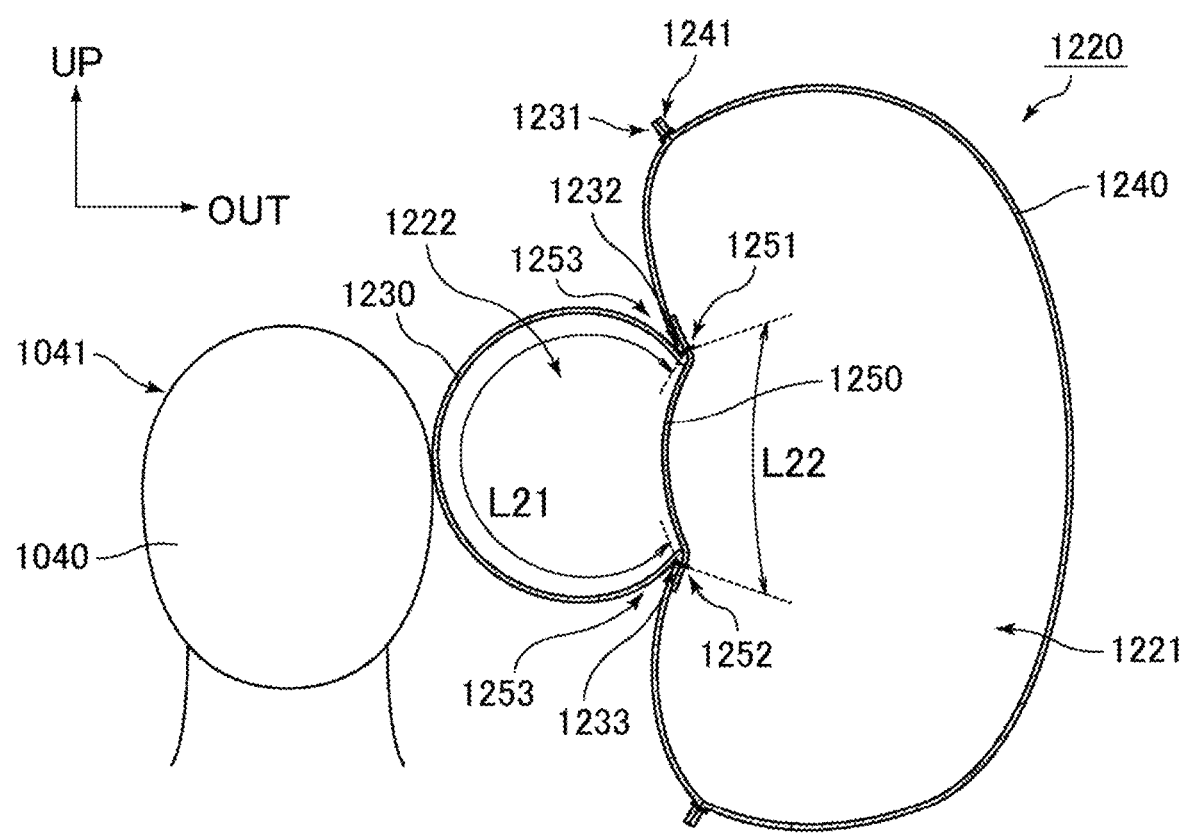
FIG. 17 is a schematic cross-sectional view illustrating a portion, as viewed from front, corresponding to a line segment D1-D2 in FIG. 16.

As illustrated in FIGS. 16 and 17, the curtain airbag 1220 includes a first panel 1230, a second panel 1240, and a regulating member 1250.

The first panel 1230 is formed of a single base cloth, and includes an edge portion 1231, a first fixing portion 1232 that is a portion different from the edge portion 1231, and a second fixing portion 1233 that is a portion different from the edge portion 1231 and that faces the first fixing portion 1232.

The first fixing portion 1232 and the second fixing portion 1233 are linear portions along a predetermined direction (hereinafter, referred to as an extending direction. Here, the front-rear direction), and are located on an inside of the edge portion 1231.

The second panel 1240 includes an edge portion 1241 coupled to the edge portion 1231 of the first panel 1230, and defines the bag-shaped curtain airbag 1220 together with the first panel 1230. Each of the first panel 1230 and the second panel 1240 is formed of a single base cloth, and is formed in substantially the same shape, for example, a band shape such that the edge portion 1231 of the first panel 1230 coincides with the edge portion 1241 of the second panel 1240.

As illustrated in FIG. 17, the curtain airbag 1220 is disposed corresponding to at least the head portion 1041 of the occupant 1040 when being inflated and deployed.

The regulating member 1250 is provided within the curtain airbag 1220, and includes a first portion 1251 fixed to the first fixing portion 1232 and a second portion 1252 fixed to the second fixing portion 1233.

The regulating member 1250 is formed of a single rectangular base cloth, and is coupled to the first panel 1230 at the first fixing portion 1232 and at the second fixing portion 1233. The first portion 1251 of the regulating member 1250 and the first fixing portion 1232 of the first panel 1230 are located at the same position on the curtain airbag 1220. The second portion 1252 of the regulating member 1250 and the second fixing portion 1233 of the first panel 1230 are located at the same position on the curtain airbag 1220.

As illustrated in FIG. 16, the regulating member 1250 is not fixed to the first panel 1230 on a lateral side (the extending direction and the opposite direction thereto, here, the front-rear direction) with respect to a direction in which the first portion 1251 and the second portion 1252 face each other, and openings 1260 through which gas can flow are respectively provided in the regulating member 1250.

The regulating member 1250 may be fixed to the first fixing portion 1232 and the second fixing portion 1233 at one end and the other end, respectively, as illustrated in FIG. 16, or may be fixed to the first fixing portion 1232 and the second fixing portion 1233 at an intermediate portion excluding end portions of the regulating member 1250. In the latter case, the one end and the other end of the regulating member 1250 may extend to the edge portion 1231 of the first panel 1230 and the edge portion 1241 of the second panel 1240, and may be coupled to both the edge portions 1231 and 1241.

As illustrated in FIG. 17, a length L21 from the first fixing portion 1232 to the second fixing portion 1233 of the first panel 1230 is longer than a length L22 from the first portion 1251 to the second portion 1252 of the regulating member 1250.

As a result, in a state where the regulating member 1250 is made flat at a stage before inflation, a portion from the first fixing portion 1232 to the second fixing portion 1233 of the first panel 1230 becomes slack. In other words, at the stage before inflation, the regulating member 1250 is fixed to the first fixing portion 1232 and the second fixing portion 1233 in a state where the portion from the first fixing portion 1232 to the second fixing portion 1233 of the first panel 1230 is slackened.

The curtain airbag 1220 includes: a main bag 1221 defined by the first panel 1230 excluding a portion between the first fixing portion 1232 and the second fixing portion 1233, the second panel 1240, and the regulating member 1250; and a sub inflation portion 1222 defined by the first panel 1230 between the first fixing portion 1232 and the second fixing portion 1233, and the regulating member 1250.

The main bag 1221 is a chamber configuring a main portion of the curtain airbag 1220, and mainly has a basic function of the curtain airbag 1220 of protecting the occupant 1040 by being inflated and deployed between the vehicle side wall 1050 and the occupant 1040 seated in the seat. As illustrated in FIG. 17, similarly to the entire curtain airbag 1220, the main bag 1221 is disposed corresponding to at least the head portion 1041 of the occupant 1040.

In addition, the main bag 1221 is provided with a plurality of linear coupling portions 1224 in which the first panel 1230 and the second panel 1240 are coupled. By the coupling portions 1224 is configured to partially regulate a thickness of the curtain airbag 1220 in a vehicle width direction in a state where the curtain airbag 1220 is inflated, to control an inflation shape of the curtain airbag 1220. Accordingly, an internal capacity and the thickness of the curtain airbag 1220 in a state where the curtain airbag 1220 is inflated are adjusted, and protection performance for the occupant 1040 (mainly, the head portion 1041) can be enhanced.

Further, a plurality of fixed cloths (tabs) 1225 are coupled, to the main bag 1221, to protrude from an upper edge of the main bag 1221. The fixed cloth 1225 is fixed to the roof side rail 1051 and the front pillar 1053, using, for example, bolts, clips, or the like.

The sub inflation portion 1222 is a chamber provided on the occupant 1040 side of the main bag 1221. The sub inflation portion 1222 is configured to be inflated and deployed between the main bag 1221 and the occupant 1040 seated in the seat to protect the occupant 1040, and has an additional function of the curtain airbag 1220 of mitigating an impact applied to the occupant 1040 in the state where the curtain airbag 1220 is inflated and deployed. As illustrated in FIG. 17, in the state where the curtain airbag 1220 is inflated and deployed, the sub inflation portion 1222 is disposed at a position corresponding to the head portion 1041 of the occupant 1040.

In the state where the curtain airbag 1220 is inflated and deployed, the gas from the inflator 1210 is introduced into the main bag 1221, the first panel 1230 faces the occupant 1040, and the sub inflation portion 1222 receives the occupant 1040.

More specifically, the gas ejected from the inflator 1210 flows out into the main bag 1221 through the gas introduction portion 1223, and then flows into the sub inflation portion 1222 from the main bag 1221 through the openings 1260. In the present embodiment, the sub inflation portion 1222 is configured to receive a side surface of the head portion 1041 of the occupant 1040.

A manufacturing process of the curtain airbag 1220 is not particularly limited. For example, similarly to the case of the first embodiment, first, the first panel 1230 and the second panel 1240 are each cut out from a base cloth, then the regulating member 1250 is cut out from the base cloth, then the second portion 1252 of the regulating member 1250 is coupled to the second fixing portion 1233 of the first panel 1230, then the first portion 1251 of the regulating member 1250 is coupled to the first fixing portion 1232 of the first panel 1230 in a state where the first panel 1230 is folded and contracted at a central portion, then a pair of edge portions 1231 and 1241 of the first panel 1230 and the second panel 1240 are overlapped and coupled, and then the coupling portions 1224 are provided by coupling predetermined positions of the first panel 1230 and the second panel 1240, thereby manufacturing a bag-shaped main bag 1221. Thereafter, the fixed cloths 1225 are coupled to the predetermined positions of the main bag 1221, whereby the bag-shaped curtain airbag 1220 can be manufactured.

Examples of a method for the above-mentioned coupling include sewing, adhesion, welding, and a combination thereof, of which sewing is particularly preferable.

As described above, in the present embodiment, the length L21 from the first fixing portion 1232 to the second fixing portion 1233 of the first panel 1230 that defines the sub inflation portion 1222 is longer than the length L22 from the first portion 1251 to the second portion 1252 of the regulating member. Therefore, similarly to the case of the first embodiment, the sub inflation portion 1222 is softer than the main bag 1221. In addition, a tension generated on a surface of the second panel 1240 is larger than that of the first panel 1230. Further, the sub inflation portion 1222 can quickly come into contact with the occupant 1040, and the soft sub inflation portion 1222 defined by a part of the first panel 1230 can be interposed between the hard main bag 1221 and the occupant 1040 and receive the occupant 1040 in a gentle manner.

In addition, similarly to the case of the first embodiment, the occupant 1040 can be safely protected at an early stage, and the curtain airbag 1220 can be easily manufactured.

In the present embodiment, as illustrated in FIG. 17, it is preferable that a constriction 1253 is provided, by the regulating member 1250, between the main bag 1221 and the sub inflation portion 1222. As a result, similarly to the case of the first embodiment, even in a case where the main bag 1221 moves after the occupant 1040 is received by the sub inflation portion 1222, the occupant 1040 can be continuously received by the sub inflation portion 1222. In this way, it is preferable that the sub inflation portion 1222 is inflated more largely than a portion from the first portion 1251 to the second portion 1252 of the regulating member 1250.

In addition, as illustrated in FIG. 17, the length L21 from the first fixing portion 1232 to the second fixing portion 1233 of the first panel 1230 is preferably longer than $\pi/2$ times the length L22 (that is, $L22 \times \pi/2$) from the first portion 1251 to the second portion 1252 of the regulating member 1250. That is, the length L21 is preferably longer than half a length of a circumference having the length L22 as a diameter. As a result, similarly to the case of the first embodiment, the constriction 1253 can be effectively formed.

An upper limit of a ratio (L21/L22) of the length L21 to the length L22 is not particularly limited, and the length L22 is preferably a length that allows gas to flow from the opening 1260 to the sub inflation portion 1222.

Hereinafter, modifications of the present embodiment will be described.

Figure 18:
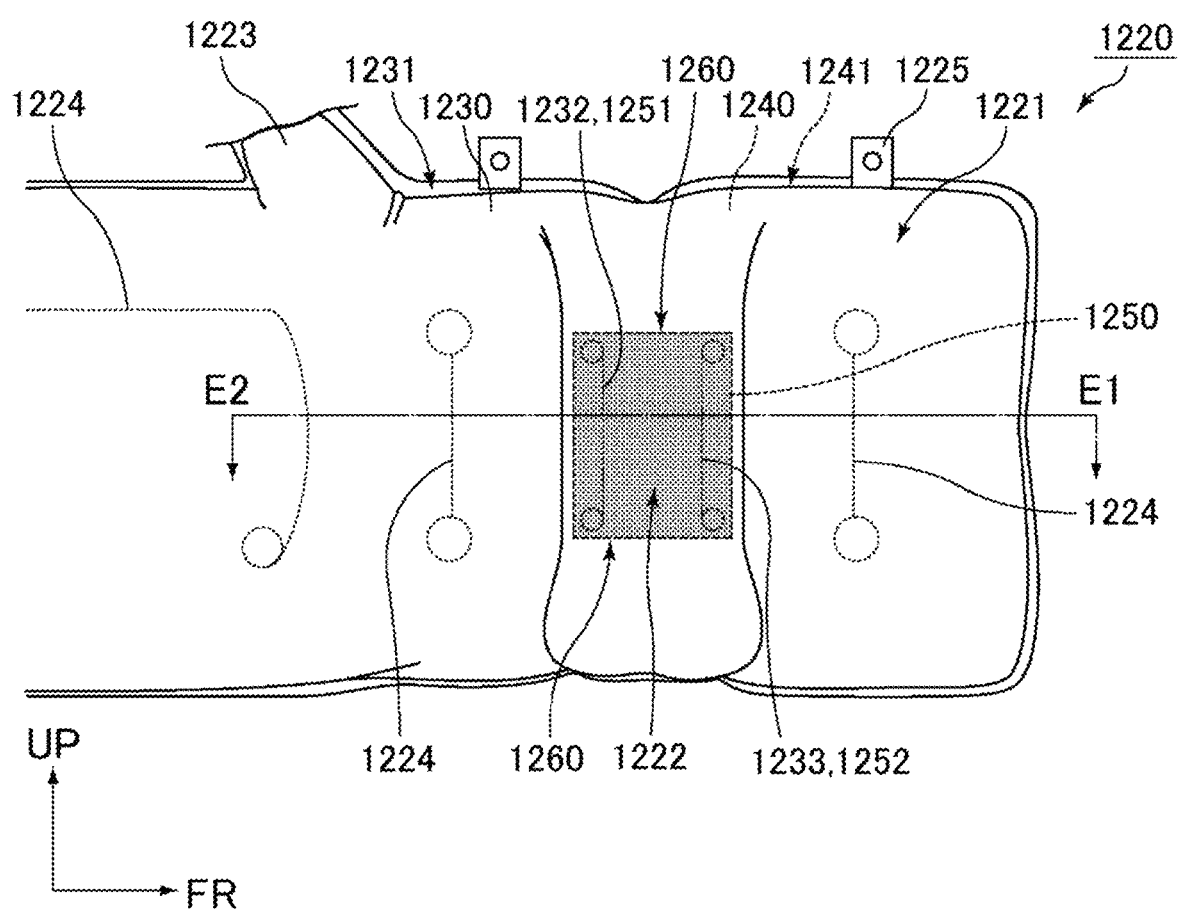
FIG. 18 is a view schematically illustrating a three-dimensional shape, as viewed from an occupant side, of the curtain airbag of the airbag device according to a first modification of the second embodiment, after inflation and deployment.
Figure 19:
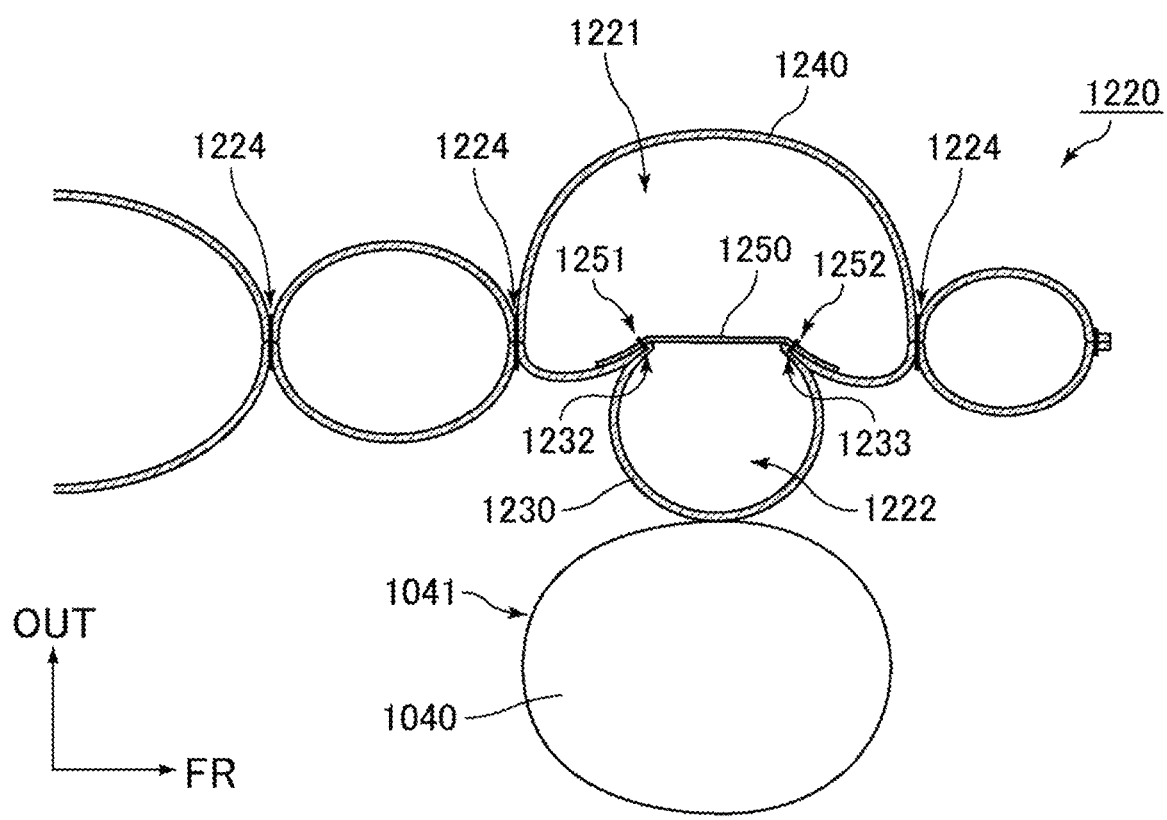
FIG. 19 is a schematic cross-sectional view illustrating a portion, as viewed from an upper side, corresponding to a line segment E1-E2 in FIG. 18.

FIG. 18 is a view schematically illustrating a three-dimensional shape, as viewed from the occupant 10 side, of the curtain airbag of the airbag device according to a first modification of the second embodiment, after inflation and deployment. FIG. 19 is a schematic cross-sectional view illustrating a portion, as viewed from an upper side, corresponding to a line segment E1-E2 in FIG. 18.

As illustrated in FIGS. 18 and 19, the extending direction along which the first fixing portion 1232 and the second fixing portion 1233 extend may be the up-down direction. In this case, the first portion 1251 and the second portion 1252 are also disposed along the up-down direction. In addition, the regulating member 1250 is not fixed to the first panel 1230 on the lateral side (the extending direction and the opposite direction thereto, here, the up-down direction) with respect to a direction in which the first portion 1251 and the second portion 1252 face each other, and openings 1260 through which gas can flow are respectively provided therein.

In the present embodiment, the extending direction along which the first fixing portion 1232 and the second fixing portion 1233 extend is not particularly limited, and may be, for example, an oblique direction intersecting the up-down direction and the front-rear direction.

In addition, in the present embodiment, the regulating member 1250 may be provided with at least one (for example, one) gas flow hole through which gas can flow.

Further, in the present embodiment, the number of the sub inflation portion 1222 per one curtain airbag 1220 is not particularly limited, and may be, for example, two or more. In addition, the number of the sub inflation portion 1222 may correspond to the number of rows of seats. For example, the same number of sub inflation portions 1222 as the number of rows of seats may be provided.

Third Embodiment

Patent Literature 2 discloses a curtain airbag device in which at least one of a plurality of chambers (air chambers) is folded back to increase a thickness at the time of inflation, thereby restraining an occupant at a position on a vehicle interior side as much as possible.

However, in the curtain airbag device disclosed in Patent Literature 2, since it is necessary to fold back the chamber and fold up the chamber under the folded back state, a manufacturing work is complicated, and a diameter of a folded back chamber portion becomes large in the curtain airbag device after being folded up.

Therefore, the third embodiment provides an airbag device capable of restraining an occupant in a state as close to a sitting posture as possible with easy manufacturing.

Hereinafter, the airbag device according to the third embodiment will be described with reference to the drawings. Statements relating to directions in the present description are based on a vehicle unless otherwise specified, for example, "front" indicates a front direction of the vehicle, "rear" indicates a rear direction of the vehicle, "upper side" indicates an upper direction of the vehicle, "lower side" indicates a lower direction of the vehicle, and "lateral side" indicates an outer direction in a vehicle width direction. In addition, an arrow FR indicates the front direction of the vehicle, an arrow UP indicates the upper direction of the vehicle, and an arrow OUT indicates the outer direction in the width direction of the vehicle, which are illustrated in the drawings as appropriate. Members disposed inside a vehicle seat are illustrated in a state where the vehicle seat is seen through.

Figure 20:
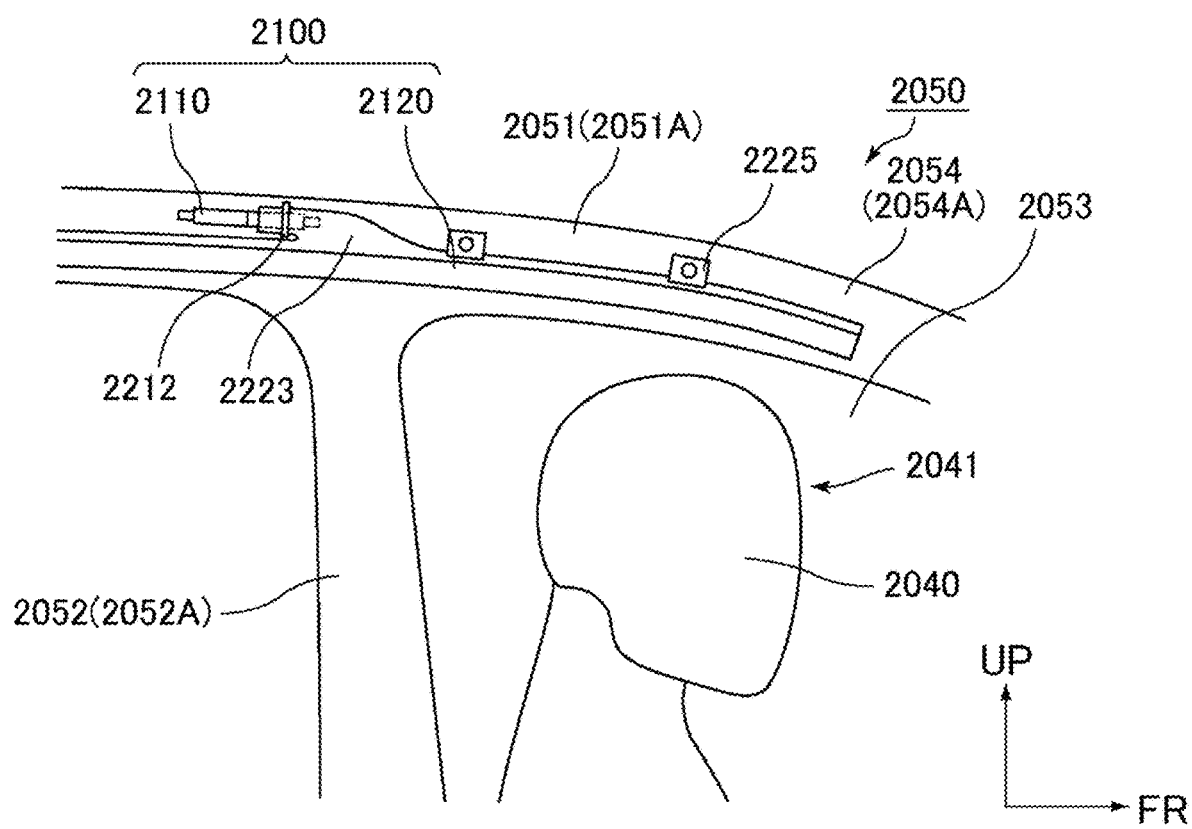
FIG. 20 is a schematic view, which is a front view of a vehicle side wall as viewed from a vehicle interior side, illustrating a state of a curtain airbag of an airbag device according to a third embodiment, before inflation and deployment.

FIG. 20 is a schematic view, which is a front view of a vehicle side wall as viewed from a vehicle interior side, illustrating a state of a curtain airbag of the airbag device according to the third embodiment, before inflation and deployment.

An airbag device 2100 is a curtain airbag device, and is covered with an interior material and stored on an upper side of a vehicle side wall 2050 of a vehicle. The airbag device 2100 is stored in a space (a storage portion of the vehicle side wall 2050) formed between the vehicle side wall 2050 and the interior material so as not to be visually recognized by an occupant in the vehicle, but in FIG. 20, for convenience of explanation, the airbag device 2100 is illustrated in a specialized manner.

The vehicle side wall 2050 is not particularly limited as long as the vehicle side wall 2050 is a vehicle body portion located on the lateral side of the occupant seated in a seat, and is a collective name for a side door, a pillar, a side window, and the like. Examples of the vehicle side wall 2050 include a roof side rail 2051 at the upper side of the vehicle, a front pillar (pillar A) 2054 at the front side of the vehicle, a center pillar (pillar B) 2052 at the center of the vehicle, a rear pillar (pillar C) (not illustrated) at the rear side of the vehicle, a side window 2053, and a door trim (not illustrated in FIG. 20). In FIG. 20, illustrations of a vehicle front portion, a vehicle rear portion, and a vehicle lower portion of the vehicle side wall 2050 are omitted.

The interior material is not particularly limited as long as the interior material is a member covering the vehicle side wall 2050, and examples of the interior material include a ceiling material 2051A covering the roof side rail 2051, a front pillar trim 2054A covering the front pillar, a center pillar trim 2052A covering the center pillar 2052, and a rear pillar trim (not illustrated) covering the rear pillar.

In the present embodiment, a world side impact dummy (World-SID) 2040 is seated on a vehicle seat (not illustrated). A sitting posture of the world side impact dummy 2040 is determined by a side impact test method (ECE R95) currently adopted in Japan and Europe and a side impact test method (FMVSS214) currently adopted in the United States. A position and a size of the airbag at the time of inflation and deployment are set according to a position of a head portion 2041 or the like of the world side impact dummy 2040 as illustrated in FIG. 20. Hereinafter, the world side impact dummy 2040 is referred to as an "occupant 2040".

The airbag device 2100 is a curtain airbag device configured to inflate and deploy on a lateral side of the occupant 2040 seated in a seat of the vehicle, and includes an inflator 2110 configured to generate gas, and a bag-shaped curtain airbag 2120 that is folded up in an inflatable and deployable manner.

The inflator 2110 is a cylindrical (columnar) gas generator, and includes a gas ejection hole at one end in a longitudinal direction of the vehicle. The gas ejection hole is inserted into a gas introduction portion 2223 of the curtain airbag 2120 sewed in a tubular shape to be formed.

The inflator 2110 is activated in an emergency of the vehicle (for example, at the time of a side impact of the vehicle). Specifically, first, in a case where an impact detection sensor mounted on the vehicle detects a side impact of the vehicle, an electronic control unit (ECU) calculates a signal sent from the impact detection sensor to determine an impact level. Then, in a case where the determined impact level corresponds to a case where the curtain airbag 2120 is inflated, the inflator 2110 is ignited, and gas is generated by a chemical reaction due to combustion. As a result, the gas generated from the inflator 2110 is introduced into the curtain airbag 2120 from the gas ejection hole of the inflator 2110 through the gas introduction portion 2223 of the curtain airbag 2120.

A type of the inflator 2110 is not particularly limited, and examples of a type of the inflator 2110 include a pyro-type inflator using gas generated by combusting a gas generating agent, a stored inflator using compressed gas, and a hybrid inflator using mixed gas of gas generated by combusting a gas generating agent and compressed gas.

The curtain airbag 2120 includes the gas introduction portion 2223 into which the gas generated from the inflator 2110 is introduced. The gas introduction portion 2223 is fastened by a band 2212 together with the inserted inflator 2110 such that the gas generated from the inflator 2110 does not leak out. The inflator 2110 is attached to the roof side rail 2051, on an upper side of the center pillar 2052. On the other hand, the gas introduction portion 2223 is disposed at an upper edge (an upper end in the vehicle height direction) of the curtain airbag 2120. Since the gas introduction portion 2223 is disposed in the center of the vehicle or the vicinity of the center of the vehicle in the front-rear direction, a gas flow from the center of the vehicle or the vicinity of the center of the vehicle in the front-rear direction toward a front end and a gas flow from the center of the vehicle or the vicinity of the center of the vehicle in the front-rear direction toward a rear end are generated within the curtain airbag 2120.

The curtain airbag 2120 is a bag-shaped body, and before being inflated and deployed, the curtain airbag 2120 is disposed on the roof side rail 2051 and the front pillar 2054, along the longitudinal direction of the vehicle. The curtain airbag 2120 is folded up into a rod shape and stored in a state of being wound with a wrapping material or the like (not illustrated) configured to be ruptured at the time of inflation. In an emergency of the vehicle, the gas generated from the inflator 2110 is introduced into the curtain airbag 2120, and the curtain airbag 2120 is inflated and starts to be deployed from the folded up state. In a state where the interior material is pushed open by a force applied from the inflated curtain airbag 2120, the curtain airbag 2120 descends into a vehicle interior and further inflates, and inflates and deploys in a curtain shape from the upper side to the lower side of the vehicle side wall 2050. As a result, since the inflated and deployed curtain airbag 2120 covers the vehicle side wall 2050 from the vehicle interior side along the front-rear direction of the vehicle, the occupant 2040 in the vehicle is protected mainly the head portion 2041.

Next, a deployed state of the airbag device 2100 will be described below with reference to FIGS. 21 and 22.

Figure 21:
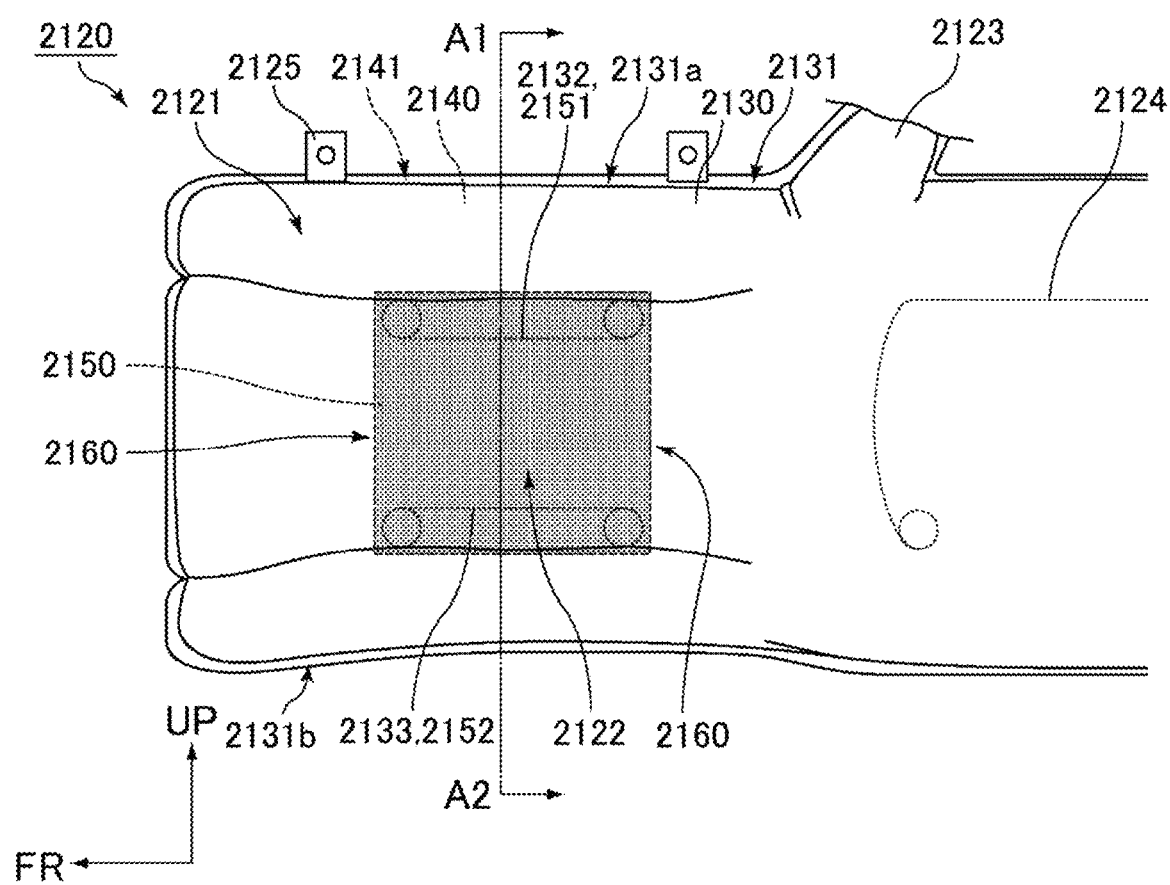
FIG. 21 is a view schematically illustrating a three-dimensional shape, as viewed from a vehicle outer side, of the curtain airbag of the airbag device according to the third embodiment, after inflation and deployment.

FIG. 21 is a view schematically illustrating a three-dimensional shape, as viewed from the vehicle outer side, of the curtain airbag of the airbag device according to the third embodiment, after inflation and deployment. FIG. 22 is a schematic cross-sectional view illustrating a portion, as viewed from front, corresponding to a line segment A1-A2 in FIG. 21.

Figure 22:
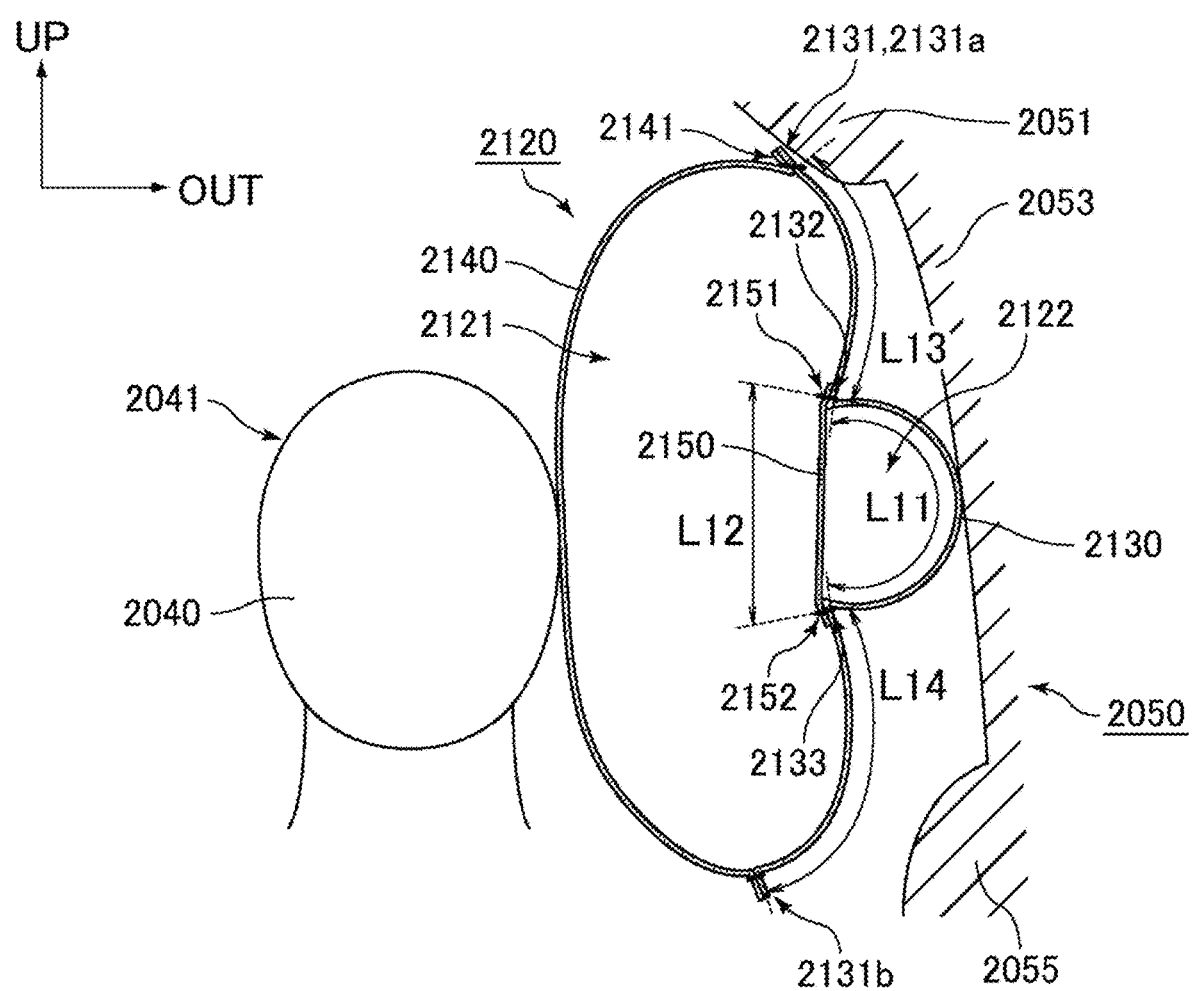
FIG. 22 is a schematic cross-sectional view illustrating a portion, as viewed from front, corresponding to a line segment A1-A2 in FIG. 2.

As illustrated in FIGS. 21 and 22, the curtain airbag 2120 includes a first panel 2130, a second panel 2140, and a regulating member 2150.

The first panel 2130 includes an edge portion 2131, a first fixing portion 2132, and a second fixing portion 2133 that faces the first fixing portion 2132. Here, the first fixing portion 2132 and the second fixing portion 2133 are portions each different from the edge portion 2131, and are provided at positions different from that of the edge portion 2131.

The first fixing portion 2132 and the second fixing portion 2133 are linear portions along a predetermined direction (hereinafter, referred to as an extending direction. Here, the front-rear direction), and are located on an inside of the first panel 2130 relative to the edge portion 2131. In addition, the first fixing portion 2132 and the second fixing portion 2133 may be substantially parallel to each other as illustrated in FIG. 21, or may be non-parallel to each other, for example, a distance therebetween may gradually change. Further, the first fixing portion 2132 and the second fixing portion 2133 may have a linear shape as illustrated in FIG. 21, or at least one thereof may have a non-linear shape such as a curved shape (for example, arc shape), a zigzag shape, or a wavy shape.

As illustrated in FIGS. 21 and 22, the edge portion 2131 of the first panel 2130 includes a first edge portion 2131a located on an outer side of the first fixing portion 2132, and a second edge portion 2131b located on an outer side of the second fixing portion 2133. That is, the first edge portion 2131a, the first fixing portion 2132, the second fixing portion 2133, and the second edge portion 2131b are arranged in this order.

The second panel 2140 includes an edge portion 2141 coupled to the edge portion 2131 of the first panel 2130, and defines the bag-shaped curtain airbag 2120 together with the first panel 2130. Each of the first panel 2130 and the second panel 2140 is formed of a single base cloth, and is formed in substantially the same shape, for example, a band shape such that the edge portion 2131 of the first panel 2130 coincides with the edge portion 2141 of the second panel 2140.

As illustrated in FIG. 22, the curtain airbag 2120 is disposed corresponding to at least the head portion 2041 of the occupant 2040 when being inflated and deployed.

The regulating member 2150 is provided within the curtain airbag 2120, and includes a first portion 2151 fixed to the first fixing portion 2132, and a second portion 2152 fixed to the second fixing portion 2133.

The regulating member 2150 is a member provided to form a sub inflation portion 2122 to be described later, is provided only on one panel (here, the first panel 2130), and regulates the first panel 2130 from completely inflating at the time of inflation and deployment. The regulating member 2150 is formed of a single band-shaped base cloth, and is coupled to the first panel 2130 at the first fixing portion 2132 and the second fixing portion 2133. The first portion 2151 of the regulating member 2150 and the first fixing portion 2132 of the first panel 2130 are located at the same position on the curtain airbag 2120. The second portion 2152 of the regulating member 2150 and the second fixing portion 2133 of the first panel 2130 are located at the same position on the curtain airbag 2120.

As illustrated in FIG. 21, the regulating member 2150 is not fixed to the first panel 2130 on a lateral side (the extending direction and the opposite direction thereto, here, the front-rear direction) with respect to a direction in which the first portion 2151 and the second portion 2152 face each other, and openings 2160 through which gas can flow are respectively provided in the regulating member 2150. Gas from the inflator 2110 can flow between a main bag 2121 to be described later and the sub inflation portion 2122 through the openings 2160.

The regulating member 2150 may be fixed to the first fixing portion 2132 and the second fixing portion 2133 at one end and the other end, respectively, as illustrated in FIG. 21, or may be fixed to the first fixing portion 2132 and the second fixing portion 2133 at an intermediate portion excluding end portions thereof. In the latter case, the one end and the other end of the regulating member 2150 may extend to the edge portion 2131 of the first panel 2130 and the edge portion 2141 of the second panel 2140, and may be coupled to both the edge portions 2131 and 2141.

As illustrated in FIG. 22, a length L11 from the first fixing portion 2132 to the second fixing portion 2133 of the first panel 2130 is longer than a length L12 from the first portion 2151 to the second portion 2152 of the regulating member 2150. In the present description, the "length from the first fixing portion to the second fixing portion of the first panel" and the "length from the first portion to the second portion of the regulating member" mean lengths each measured in a state where a cross section (for example, a cross section in FIG. 22) passing through any first point (which may be a point on each site of the first fixing portion) on the first fixing portion and a second point located at a shortest distance from the first point on the second fixing portion is viewed.

As a result, in a state where the regulating member 2150 is made flat at a stage before inflation, a portion from the first fixing portion 2132 to the second fixing portion 2133 of the first panel 2130 becomes slack. In other words, at the stage before inflation, the regulating member 2150 is fixed to the first fixing portion 2132 and the second fixing portion 2133 in a state where the portion from the first fixing portion 2132 to the second fixing portion 2133 of the first panel 2130 is slackened.

The curtain airbag 2120 includes: a main bag 2121 defined by the first panel 2130 excluding a portion between the first fixing portion 2132 and the second fixing portion 2133, the second panel 2140, and the regulating member 2150; and a sub inflation portion 2122 defined by the first panel 2130 between the first fixing portion 2132 and the second fixing portion 2133, and the regulating member 2150.

The main bag 2121 is a chamber configuring a main portion of the curtain airbag 2120. The main bag 2121 mainly has a basic function of the curtain airbag 2120 of protecting the occupant 2040 by being inflated and deployed between the vehicle side wall 2050 and the occupant 2040 seated in the seat. As illustrated in FIG. 22, similarly to the entire curtain airbag 2120, the main bag 2121 is disposed corresponding to at least the head portion 2041 of the occupant 2040.

The main bag 2121 is provided with a plurality of linear coupling portions 2124 in which the first panel 2130 and the second panel 2140 are coupled. The coupling portion 2124 is configured to partially regulate a thickness of the curtain airbag 2120 in the vehicle width direction in a case where the curtain airbag 2120 is inflated, and to control an inflation shape of the curtain airbag 2120. Accordingly, an internal capacity and the thickness of the curtain airbag 2120 at the time of inflation are adjusted, and protection performance for the occupant 2040 (mainly, the head portion 2041) can be enhanced.

In the curtain airbag 2120 (main bag 2121), a plurality of fixed cloths (tabs) 2225 are provided, as fixing portions, at an upper edge portion of the curtain airbag 2120 (main bag 2121). The fixed cloth 2225 is coupled to protrude from the upper edge of the main bag 2121. The fixed cloths 2225 are fixed to an upper portion of a vehicle side portion, for example, the roof side rail 2051 and the front pillar 2054, using, for example, bolts, clips, or the like.

The sub inflation portion 2122 is a chamber provided on the vehicle outer side (an opposite side to the occupant 2040) of the main bag 2121. The sub inflation portion 2122 is configured to move the main bag 2121 toward an occupant 2040 side by being inflated and deployed between the main bag 2121 and the vehicle, and has an additional function of the curtain airbag 2120 of gaining a stroke between the occupant 2040 and the vehicle in a case where the curtain airbag 2120 is inflated and deployed. As illustrated in FIG. 22, in the case where the curtain airbag 2120 is inflated and deployed, the sub inflation portion 2122 is disposed at a position corresponding to the head portion 2041 of the occupant 2040.

In the case where the curtain airbag 2120 is inflated and deployed, the gas from the inflator 2110 is introduced into the main bag 2121, the second panel 2140 faces the occupant 2040, and the sub inflation portion 2122 comes into contact with the vehicle. Therefore, the first panel 2130 faces the opposite side (vehicle outer side) to the occupant 2040.

More specifically, the gas ejected from the inflator 2110 flows out into the main bag 2121 through the gas introduction portion 2223, and then flows into the sub inflation portion 2122 from the main bag 2121 through the openings 2160 for inflation. In the present embodiment, the sub inflation portion 2122 is configured to come into contact with the vehicle side wall 2050, for example, the side window 2053.

A manufacturing process of the curtain airbag 2120 is not particularly limited. For example, first, the first panel 2130 and the second panel 2140 are each cut out from a base cloth, then the regulating member 2150 is cut out from the base cloth, then the second portion 2152 of the regulating member 2150 is coupled to the second fixing portion 2133 of the first panel 2130, then the first portion 2151 of the regulating member 2150 is coupled to the first fixing portion 2132 of the first panel 2130 in a state where the first panel 2130 is folded and contracted at a central portion, then a pair of edge portions 2131 and 2141 of the first panel 2130 and the second panel 2140 are overlapped and coupled, and then the coupling portions 2124 are provided by coupling predetermined positions of the first panel 2130 and the second panel 2140, thereby manufacturing a bag-shaped main bag 2121. Thereafter, the fixed cloths 2225 are coupled to the predetermined positions of the main bag 2121, whereby the bag-shaped curtain airbag 2120 is manufactured.

Examples of a method for the above-mentioned coupling include sewing, adhesion, welding, and a combination thereof, of which sewing is particularly preferable.

The base cloth used for the first panel 2130, the second panel 2140, the regulating member 2150, and the fixed cloths 2225 may be formed of, for example, a thread such as nylon 66 or polyethylene terephthalate (PET). In addition, in order to improve heat resistance, air tightness, or the like, the base cloth may have a surface coated with silicon or the like.

As described above, in the present embodiment, the length L11 from the first fixing portion 2132 to the second fixing portion 2133 of the first panel 2130 that defines the sub inflation portion 2122 is longer than the length L12 from the first portion 2151 to the second portion 2152 of the regulating member 2150. Therefore, in the curtain airbag 2120 defined in a bag shape by coupling the pair of edge portions 2131 and 2141 of the first panel 2130 and the second panel 2140, for the main bag 2121 and the sub inflation portion 2122 separated by the regulating member 2150, the main bag 2121 is larger than the sub inflation portion 2122, and a reaction force of the curtain airbag 2120 generated due to an internal pressure is also larger in the main bag 2121 than in the sub inflation portion 2122. Therefore, the sub inflation portion 2122 is softer than the main bag 2121. In addition, due to a difference in size between the main bag 2121 and the sub inflation portion 2122, a tension generated on a surface of the second panel 2140 defining the main bag 2121 by the inflation of the curtain airbag 2120 is also larger than that of the first panel 2130.

In a state where the airbag device 2100 is activated and gas is generated from the inflator 2110, the gas is introduced from the inflator 2110 into the main bag 2121, and the main bag 2121 is inflated and deployed. In this case, in the curtain airbag 2120, since a portion where the regulating member 2150 is provided is inflated and deployed, the sub inflation portion 2122 is also deployed, and the gas flows in from a space (openings 2160) between the first panel 2130 and the regulating member 2150 to inflate the sub inflation portion 2122. In this case, in a state where the sub inflation portion 2122 comes into contact with the vehicle, the curtain airbag 2120 moves toward the occupant 2040 side by the reaction force thereof. As a result, the main bag 2121 and the occupant 2040 can be quickly brought into contact with each other, and a stroke between the occupant 2040 and the vehicle can be gained because the sub inflation portion 2122 is located between the main bag 2121 and the vehicle.

In addition, as described above, since the main bag 2121 and the occupant 2040 can be quickly brought into contact with each other, and the stroke between the occupant 2040 and the vehicle can be gained because the sub inflation portion 2122 is located between the main bag 2121 and the vehicle, the occupant 2040 can be restrained at a position on the vehicle interior side as much as possible. That is, the occupant 2040 can be restrained in a state as close to the sitting posture as possible.

Further, at the time of manufacturing the curtain airbag 2120, after the regulating member 2150 is attached to the first panel 2130, the pair of edge portions 2131 and 2141 of the first panel 2130 and the second panel 2140 may be overlapped and coupled, and thus the curtain airbag 2120 can be easily manufactured.

In the present embodiment, a ratio (L11/L12) of the length L11 to the length L12 is not particularly limited, and the length L12 is preferably a length that allows gas to flow from the openings 2160 to the sub inflation portion 2122.

In the present embodiment, as illustrated in FIG. 22, the length L12 from the first portion 2151 to the second portion 2152 of the regulating member 2150 is preferably shorter than a length L13 from the first fixing portion 2132 to the first edge portion 2131a of the first panel 2130, and shorter than a length L14 from the second fixing portion 2133 to the second edge portion 2131b of the first panel 2130. As a result, a thickness of the main bag 2121 can be increased. Therefore, it is possible to gain a stroke in a case where the curtain airbag 2120 is pressed by the vehicle and the occupant 2040.

Here, the "length from the first fixing portion to the first edge portion of the first panel" and the "length from the second fixing portion to the second edge portion of the first panel" mean lengths each measured in a state where a cross section (for example, the cross section in FIG. 22) passing through any first point (which may be a point on each site of the first fixing portion) on the first fixing portion and a second point located at a shortest distance from the first point on the second fixing portion is viewed.

A ratio (L12/L13) of the length L12 to the length L13, and a ratio (L12/L14) of the length L12 to the length L14 are not particularly limited.

Hereinafter, modifications of the present embodiment will be described.

Figure 23:
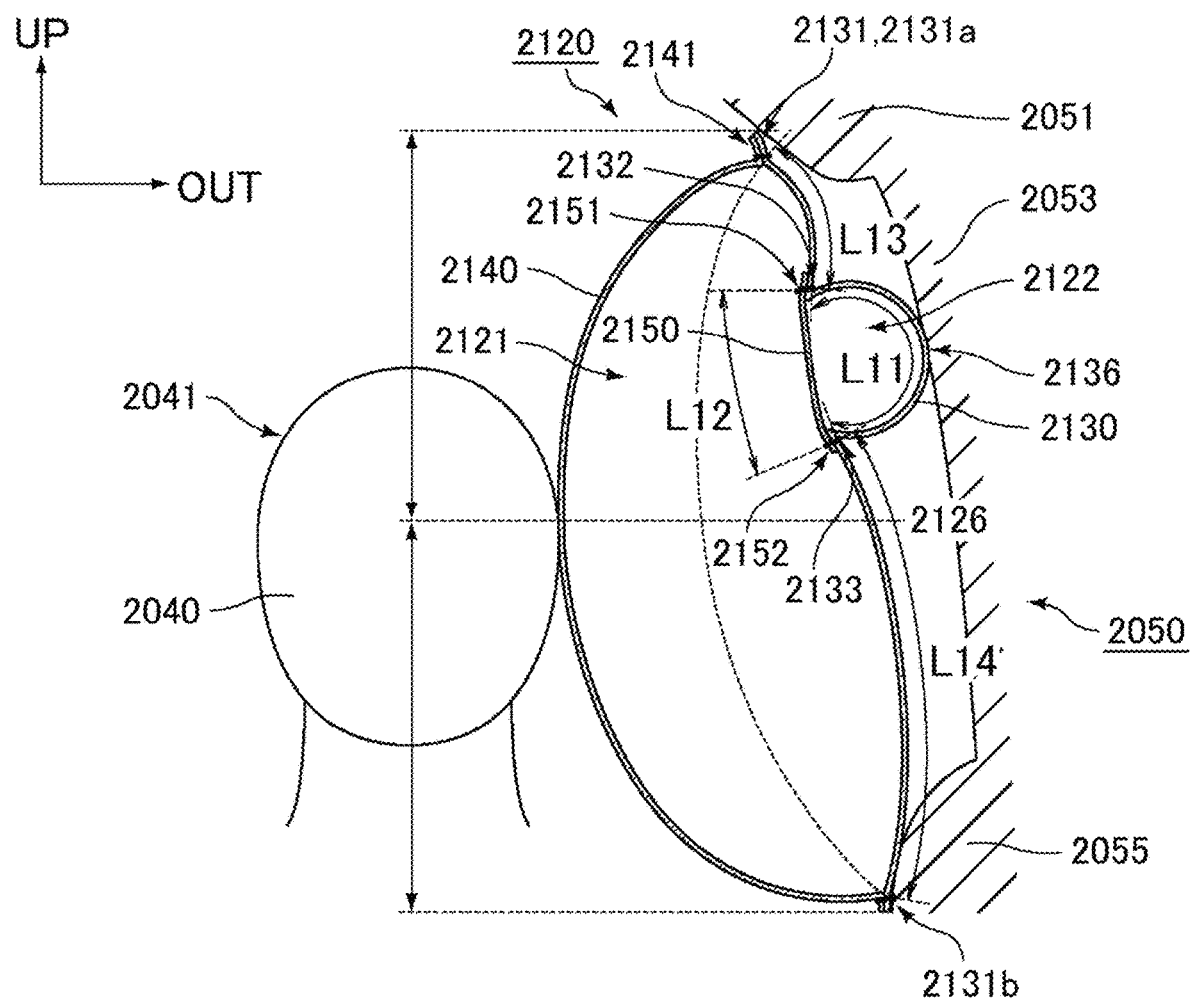
FIG. 23 is a sectional view schematically illustrating a three-dimensional shape, as viewed from front, of the curtain airbag of an airbag device according to a first modification of the third embodiment, after inflation and deployment.

FIG. 23 is a sectional view schematically illustrating a three-dimensional shape, as viewed from front, of the curtain airbag of the airbag device according to a first modification of the third embodiment, after inflation and deployment. FIG. 23 illustrates a portion corresponding to the line segment A1-A2 in FIG. 21.

In the present embodiment, as illustrated in FIG. 23, the length L14 from the second fixing portion 2133 to the second edge portion 2131b of the first panel 2130 is preferably longer than the length L13 from the first fixing portion 2132 to the first edge portion 2131a of the first panel 2130. That is, a location of the sub inflation portion 2122a is preferably closer to the first edge portion 2131a than to the second edge portion 2131b. As a result, as illustrated in FIG. 23, since the curtain airbag 2120 is configured to move toward the occupant 2040 side by the sub inflation portion 2122 coming into contact with the side window 2053, an inflation and deployment position of the curtain airbag 2120 can be adjusted in accordance with a distance to the occupant 2040 and a body shape of the occupant 2040.

Further, the curtain airbag 2120 on a second edge portion 2131b side is configured to bent toward a vehicle side wall 2050 side. Therefore, the curtain airbag 2120 on the second edge portion 2131b side is easily brought into contact with the vehicle side wall 2050 (door trim 2055), movement of the curtain airbag 2120 toward the vehicle side wall 2050 side can be regulated, and the occupant 2040 can be reliably received.

In this case, a ratio (L14/L13) of the length L14 to the length L13 is not particularly limited.

In the present embodiment, as illustrated in FIG. 23, it is preferable that an intermediate portion 2136 between the first fixing portion 2132 and the second fixing portion 2133 is located on an upper side with respect to an intermediate 2126, in the vehicle height direction, of the curtain airbag 2120. As a result, an apex of the sub inflation portion 2122 in the vehicle width direction is located on an upper side of the curtain airbag 2120. In addition, since the vehicle side wall 2050 is located more on a vehicle inner side as approaching the upper side, the sub inflation portion 2122 is likely to come into contact with the vehicle side portion, and the curtain airbag 2120 is likely to move toward the occupant 2040 side at an earlier stage.

Figure 24:
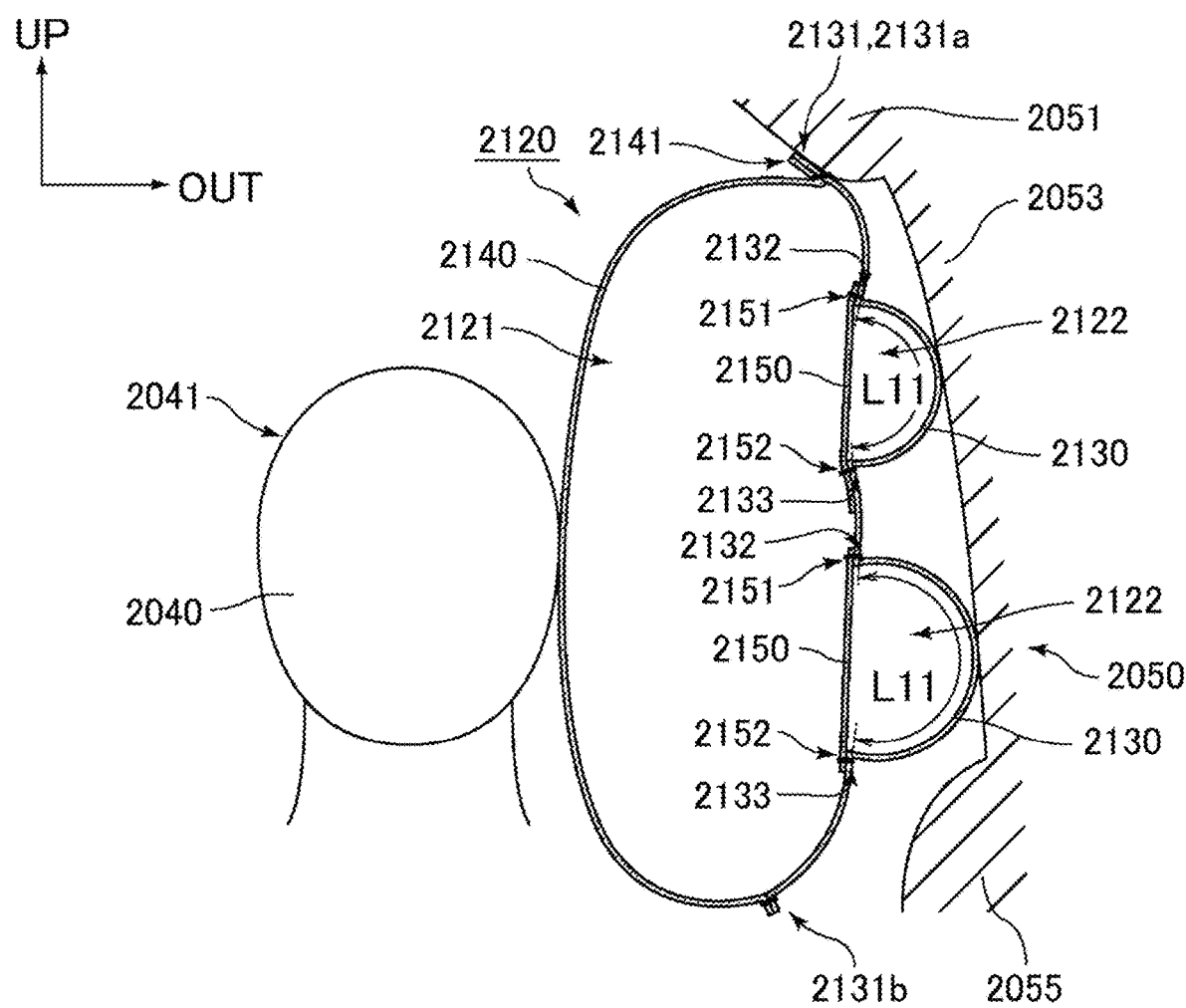
FIG. 24 is a sectional view schematically illustrating a three-dimensional shape, as viewed from front, of the curtain airbag of an airbag device according to a second modification of the third embodiment, after inflation and deployment.

FIG. 24 is a sectional view schematically illustrating a three-dimensional shape, as viewed from front, of the curtain airbag of the airbag device according to a second modification of the third embodiment, after inflation and deployment. FIG. 24 illustrates a portion corresponding to the line segment A1-A2 in FIG. 21.

In the present embodiment, as illustrated in FIG. 24, two or more sub inflation portions 2122 may be provided. In the example illustrated in FIG. 24, the plurality of sub inflation portions 2122 are arranged side by side in the same direction (here, the up-down direction). The plurality of sub inflation portions 2122 arranged side by side in the up-down direction may be larger as being located lower. That is, the length L11 from the first fixing portion 2132 to the second fixing portion 2133 of the first panel 2130 may be longer as the sub inflation portion 2122 is located lower.

In the present embodiment, the number of the sub inflation portions 2122 per one curtain airbag 2120 is not particularly limited, and may be, for example, one or two or more. In addition, the number of the sub inflation portion 1222 may correspond to the number of rows of seats. For example, the same number of sub inflation portions 2122 as the number of rows of seats may be provided. That is, one sub inflation portion 2122 may be provided for each row of seats. In addition, a plurality of sub inflation portions 2122 may be provided for each row of seats.

Figure 25:
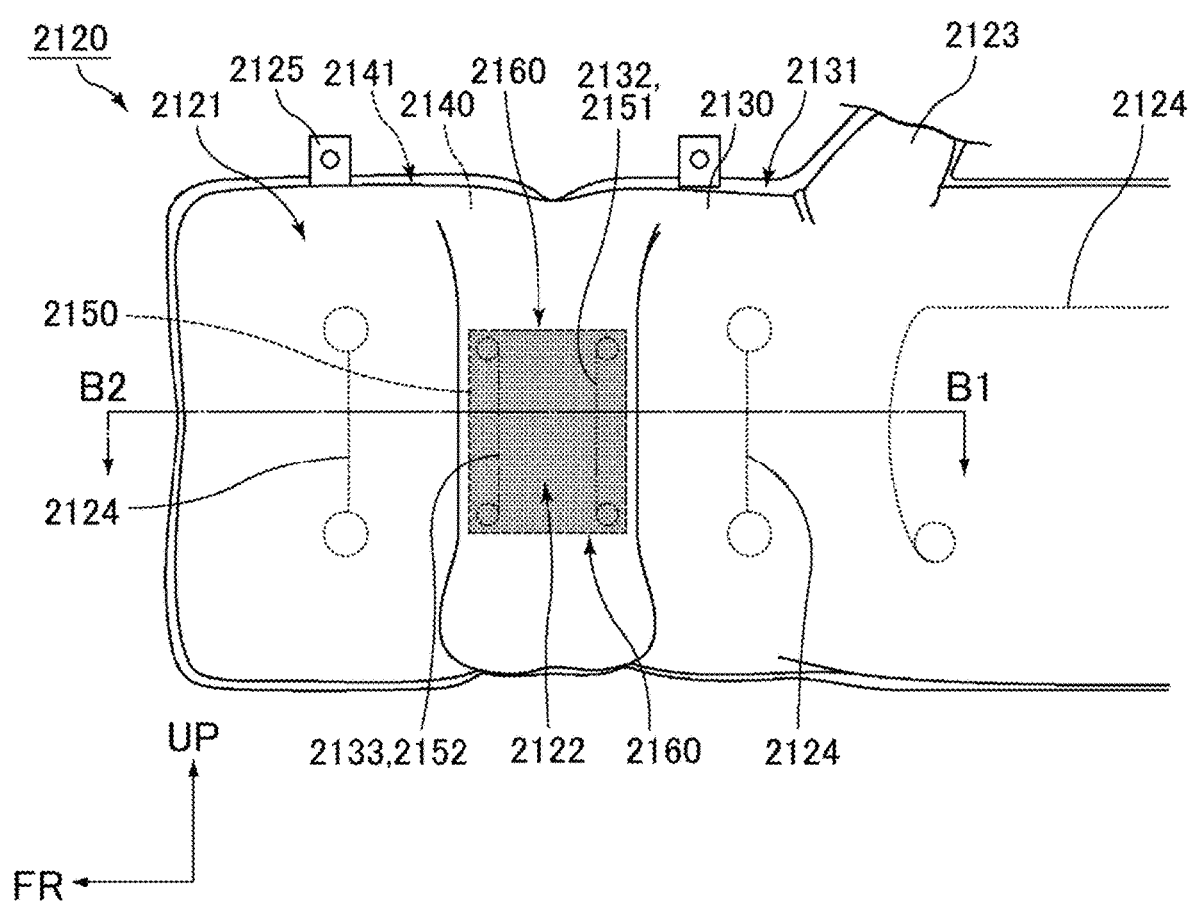
FIG. 25 is a view schematically illustrating a three-dimensional shape, as viewed from a vehicle outer side, of the curtain airbag of an airbag device according to a third modification of the third embodiment, after inflation and deployment.
Figure 26:
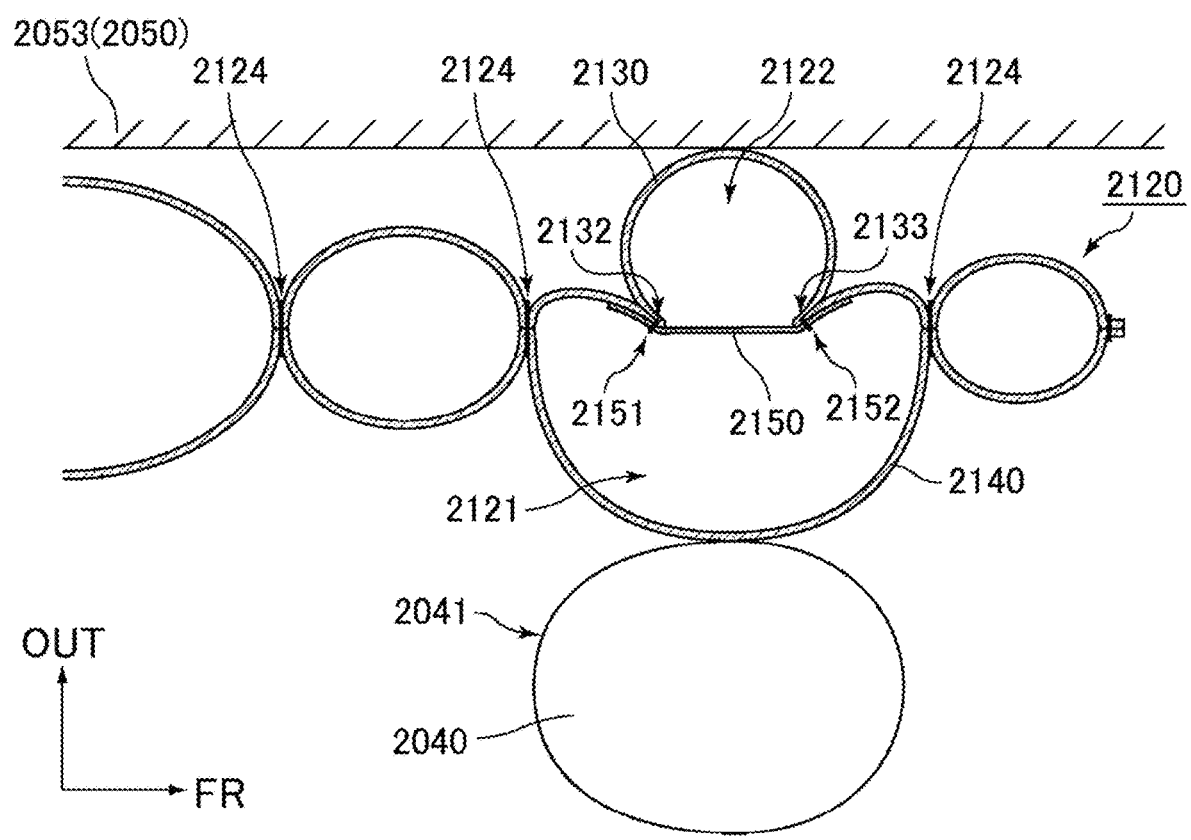
FIG. 26 is a schematic cross-sectional view illustrating a portion, as viewed from an upper side, corresponding to a line segment B1-B2 in FIG. 6.

FIG. 25 is a view schematically illustrating a three-dimensional shape, as viewed from the vehicle outer side, of the curtain airbag of the airbag device according to a third modification of the third embodiment, after inflation and deployment. FIG. 26 is a schematic cross-sectional view illustrating a portion, as viewed from an upper side, corresponding to a line segment B1-B2 in FIG. 25.

As illustrated in FIGS. 25 and 26, the extending direction along which the first fixing portion 2132 and the second fixing portion 2133 extend may be the up-down direction. In this case, the first portion 2151 and the second portion 2152 are also disposed along the up-down direction, and the regulating member 2150 is not fixed to the first panel 2130 on the lateral side (the extending direction and the opposite direction thereto, here, the up-down direction) with respect to the direction in which the first portion 2151 and the second portion 2152 face each other, and the openings 2160 through which gas can flow are respectively provided in the regulating member 2150.

In the present embodiment, the extending direction along which the first fixing portion 2132 and the second fixing portion 2133 extend is not particularly limited, and may be, for example, an oblique direction intersecting the up-down direction and the front-rear direction.

In the present embodiment, at least one of the first fixing portion 2132 or the second fixing portion 2133 may be provided at a position different from the edge portion 2131 of the first panel 2130, and one of the first fixing portion 2132 and the second fixing portion 2133 may be provided at the same position as the edge portion 2131. In this case, one of the first fixing portion 2132 and the second fixing portion 2133, one of the first portion 2151 and the second portion 2152 of the regulating member 2150, and the edge portion 2141 of the second panel 2140 are coupled together at the edge portion 2131 of the first panel 2130.

In addition, in the present embodiment, the regulating member 2150 may be provided with at least one (for example, one) gas flow hole through which gas can flow.

Fourth Embodiment

Hereinafter, an airbag device according to a fourth embodiment will be described with reference to the drawings. A side airbag device according to the fourth embodiment is the same as the airbag device according to the third embodiment except that the airbag to which a sub inflation portion is to be provided is different. In the present embodiment, the sub inflation portion is provided in a side airbag.

Figure 27:
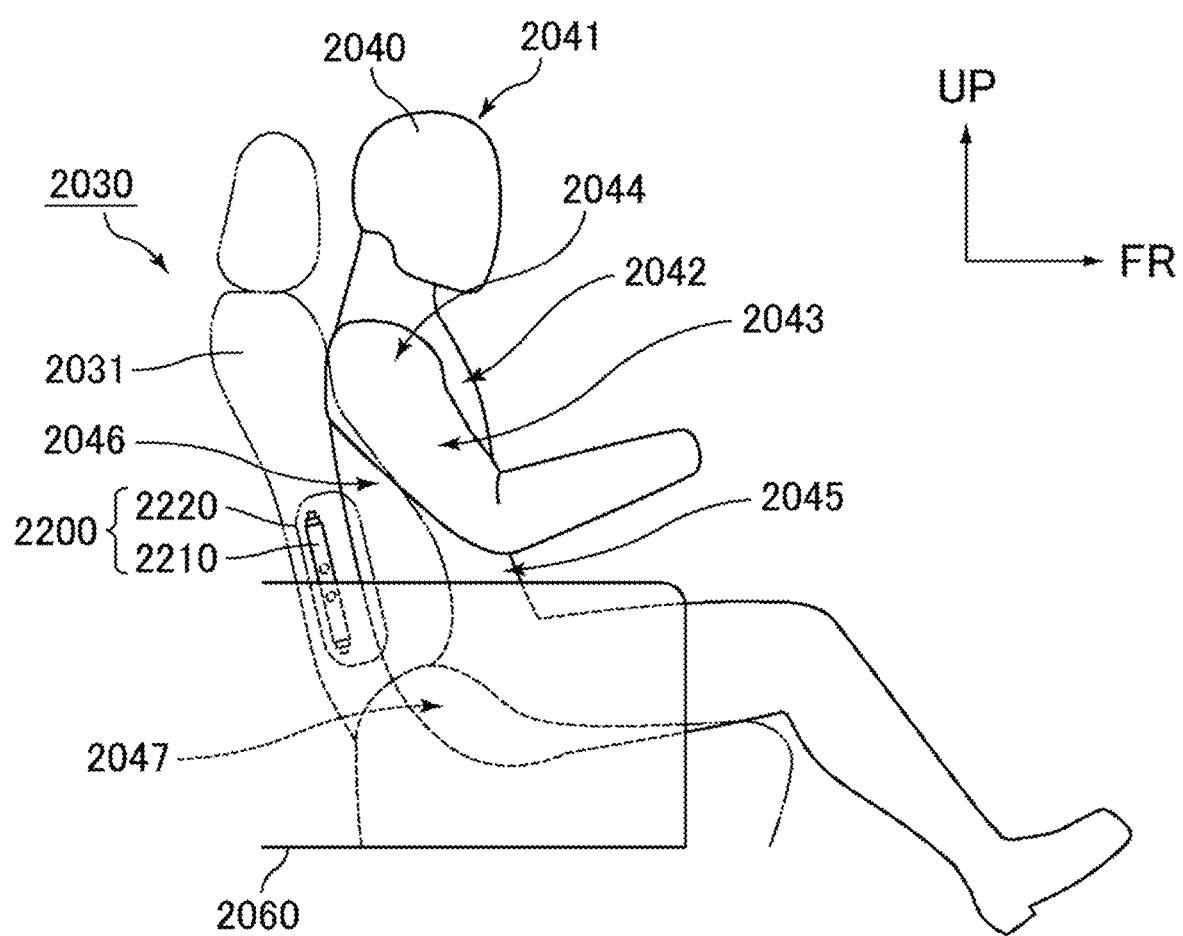
FIG. 27 is a schematic view illustrating a state, as viewed from a lateral side, of a side airbag of an airbag device according to a fourth embodiment, before inflation and deployment.
Figure 28:
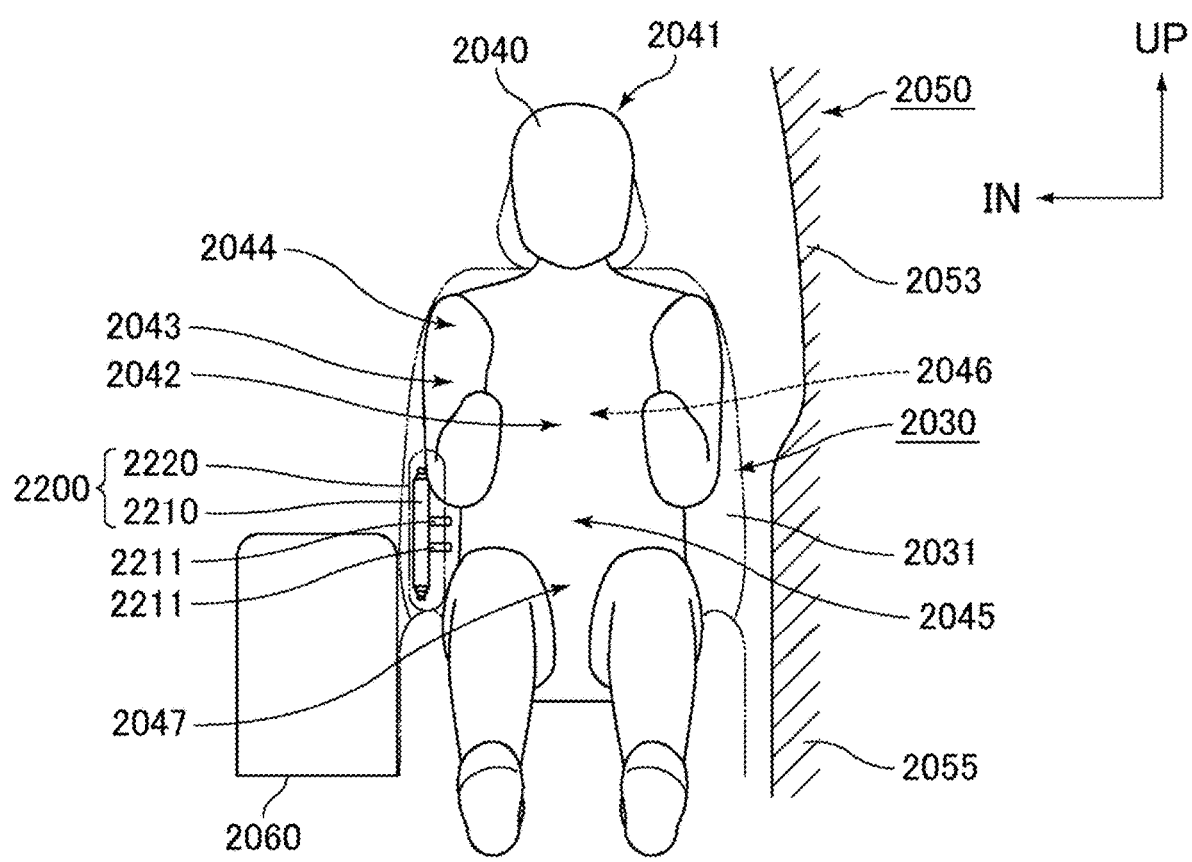
FIG. 28 is a schematic view illustrating a state, as viewed from front, of a side airbag of the airbag device according to the fourth embodiment, before inflation and deployment.

FIG. 27 is a schematic view illustrating a state, as viewed from the lateral side, of a side airbag of the airbag device according to the fourth embodiment, before inflation and deployment. FIG. 28 is a schematic view illustrating a state, as viewed from front, of the side airbag of the airbag device according to the fourth embodiment, before inflation and deployment.

As illustrated in FIGS. 27 and 28, an airbag device 2200 is a side airbag device configured to inflate and deploy on the lateral side of the occupant 2040 seated in a vehicle seat (seat of the vehicle) 2030, and is attached to a side portion (side portion on the inner side in the vehicle width direction) of a seat back (backrest portion) 2031 of the vehicle seat 2030.

The vehicle seat 2030 is assumed to be, for example, a driver seat or a passenger seat of the vehicle.

In the present embodiment, a position and a size of the airbag at the time of inflation and deployment are set according to positions of the head portion 2041, a chest portion 2042, an arm portion 2043, a shoulder portion 2044, an abdomen portion 2045, a back portion 2046, and a waist portion 2047 of the occupant 2040, as illustrated in FIGS. 27 and 28.

The vehicle side wall 2050 is not particularly limited as long as the vehicle side wall 2050 is a vehicle body portion located on the vehicle outer side (an opposite side to a console box 2060) of the occupant 2040 seated in the vehicle seat 2030, and is a collective name for a side door, a pillar, a side window, and the like.

The console box 2060 is provided on the vehicle inner side of the vehicle seat 2030. For example, the console box 2060 is provided between a driver seat and a passenger seat at a central portion, in the vehicle width direction, inside the vehicle. The console box 2060 may function as an arm-placed portion (armrest portion) configured to support the arm portion 2043, on the vehicle inner side, of the occupant 2040.

As illustrated in FIGS. 27 and 28, the airbag device 2200 includes a bag-shaped side airbag 2220 folded up in an inflatable and deployable manner, and an inflator 2210 disposed within the side airbag 2220.

The side airbag 2220 is a bag-shaped body, and before being inflated and deployed, the side airbag 2220 is fixed to a side portion of the vehicle seat 2030, here, the side portion of the seat back 2031, via the inflator 2210 in a folded up state, and is covered with a cover of the seat back 2031 and stored together with a cushion pad.

The inflator 2210 is a cylindrical (columnar) gas generator, and is disposed along an extension direction (height direction) of the seat back 2031. A pair of bolts 2211 protrude from an upper side portion and a lower side portion of the inflator 2210, and the pair of bolts 2211 penetrate through the side airbag 2220. The inflator 2210 is attached to the side portion of the seat back 2031 by the pair of bolts 2211.

Similarly to the case of the third embodiment, the inflator 2210 is activated in an emergency of the vehicle (for example, at the time of a side impact of the vehicle). Gas generated from the inflator 2210 is introduced into the side airbag 2220.

A type of the inflator 2210 is not particularly limited, and examples thereof include those exemplified in the third embodiment.

Figure 29:
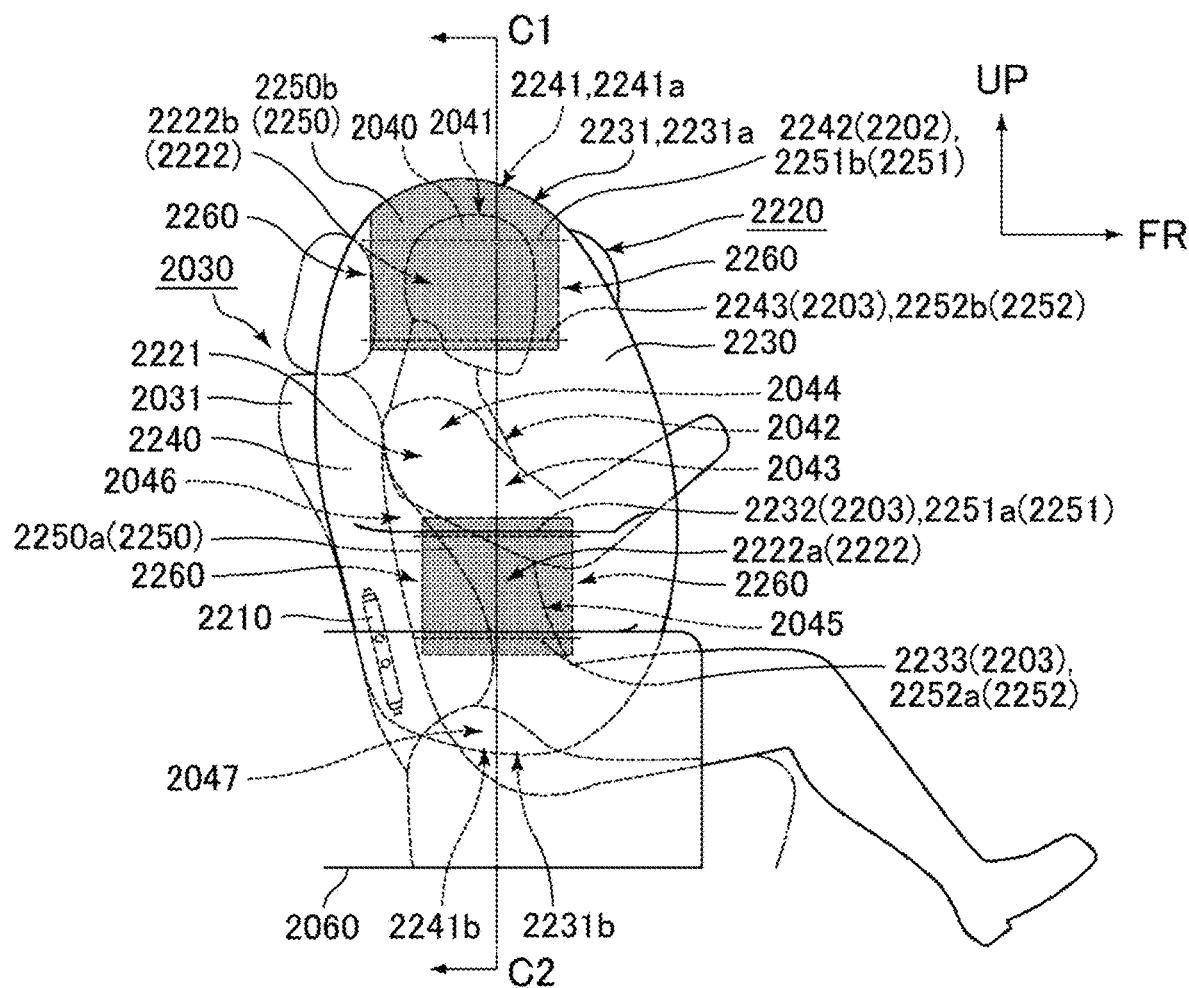
FIG. 29 is a schematic view illustrating a state, as viewed from the lateral side, of the airbag of the airbag device according to the fourth embodiment, after inflation and deployment.
Figure 30:
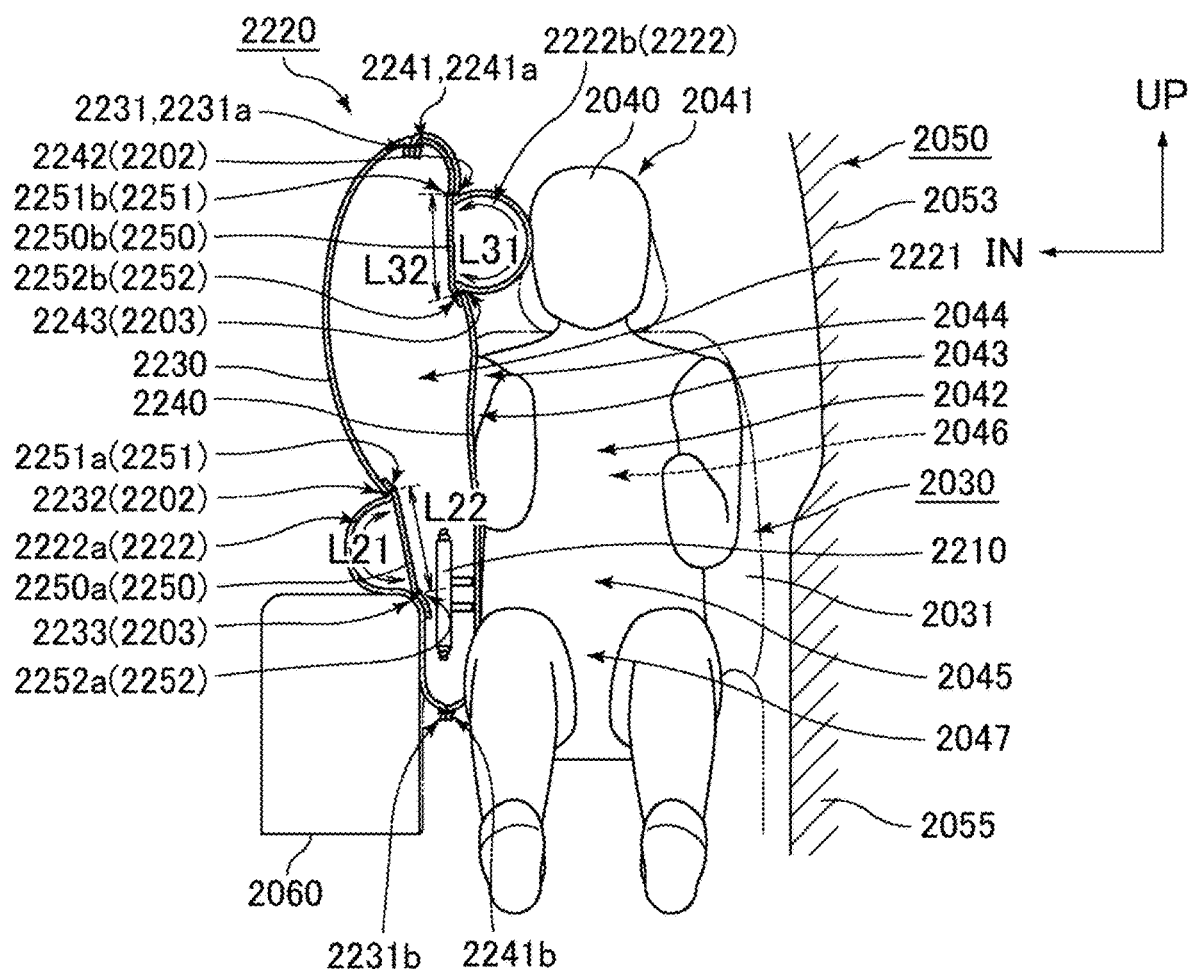
FIG. 30 is a schematic cross-sectional view illustrating a portion, as viewed from front, corresponding to a line segment C1-C2 in FIG. 10.

FIG. 29 is a schematic view illustrating a state, as viewed from the lateral side, of the airbag of the airbag device according to the fourth embodiment, after inflation and deployment. FIG. 30 is a schematic cross-sectional view illustrating a portion, as viewed from front, corresponding to a line segment C1-C2 in FIG. 29.

In a case where the vehicle gets into a side impact with an obstacle (for example, another vehicle) and the inflator 2210 is activated, the gas generated from the inflator 2210 is introduced into the side airbag 2220, and the side airbag 2220 is inflated while being deployed from the folded up state. Then, in a case where the cover of the seat back 2031 is torn by a force applied from the inflated side airbag 2220, as illustrated in FIGS. 29 and 30, the side airbag 2220 is inflated and deployed (fully deployed) on an upper side of the console box 2060 and on the lateral side of the occupant 2040 seated in the vehicle seat 2030 to protect the side portion of the occupant 2040. The airbag that is inflated and deployed in this manner is also called a far side airbag.

In addition, the side airbag 2220 includes a first panel 2230, a second panel 2240, a first regulating member 2250a, and a second regulating member 2250b.

The first panel 2230 includes an edge portion 2231, a first fixing portion 2232 that is a portion different from the edge portion 2231, and a second fixing portion 2233 that is a portion different from the edge portion 2231 and faces the first fixing portion 2232.

The first fixing portion 2232 and the second fixing portion 2233 are linear portions along a predetermined direction (hereinafter, referred to as an extending direction. Here, the front-rear direction), and are located inward of the edge portion 2231. In addition, the first fixing portion 2232 and the second fixing portion 2233 may be substantially parallel to each other as illustrated in FIG. 29, or may be non-parallel to each other, for example, a distance therebetween may gradually change. Further, the first fixing portion 2232 and the second fixing portion 2233 may have a linear shape as illustrated in FIG. 29, or at least one thereof may have a non-linear shape such as a curved shape (for example, arc shape), a zigzag shape, or a wavy shape.

The edge portion 2231 of the first panel 2230 includes a first edge portion 2231a located outside of the first panel 2230 relative to the first fixing portion 2232, and a second edge portion 2231b located outside of the first panel 2230 relative to the second fixing portion 2233. That is, the first edge portion 2231a, the first fixing portion 2232, the second fixing portion 2233, and the second edge portion 2231b are arranged in this order.

The second panel 2240 includes an edge portion 2241 coupled to the edge portion 2231 of the first panel 2230, and defines the bag-shaped side airbag 2220 together with the first panel 2230. Each of the first panel 2230 and the second panel 2240 is formed of a single base cloth, and is formed in substantially the same shape, for example, a rectangular shape such that the edge portion 2231 of the first panel 2230 coincides with the edge portion 2241 of the second panel 2240.

In addition, the second panel 2240 further includes a first fixing portion 2242 that is a portion different from the edge portion 2241, and a second fixing portion 2243 that is a portion different from the edge portion 2241 and faces the first fixing portion 2242.

The first fixing portion 2242 and the second fixing portion 2243 are linear portions along a predetermined direction (hereinafter, referred to as an extending direction. Here, the front-rear direction), and are located inward of the edge portion 2241. In addition, the first fixing portion 2242 and the second fixing portion 2243 may be substantially parallel to each other as illustrated in FIG. 29, or may be non-parallel to each other, for example, a distance therebetween may gradually change. Further, the first fixing portion 2242 and the second fixing portion 2243 may have a linear shape as illustrated in FIG. 29, or at least one thereof may have a non-linear shape such as a curved shape (for example, arc shape), a zigzag shape, or a wavy shape.

The edge portion 2241 of the second panel 2240 includes a first edge portion 2241a located outside the first fixing portion 2242, and a second edge portion 2241b located outside the second fixing portion 2243. That is, the first edge portion 2241a, the first fixing portion 2242, the second fixing portion 2243, and the second edge portion 2241b are arranged in this order.

Hereinafter, the first fixing portions 2232 and 2242 will be described as a first fixing portion 2202 when not distinguished from each other, and the second fixing portions 2233 and 2243 will be described as a second fixing portion 2203 when not distinguished from each other.

As illustrated in FIG. 29, the side airbag 2220 is disposed corresponding to a position from the head portion 2041 to the waist portion 2047 via the shoulder portion 2044, the chest portion 2042, and the abdomen portion 2045 of the occupant 2040 in a case where the side airbag 2220 is inflated and deployed.

The first regulating member 2250a is provided within the side airbag 2220, and includes a first portion 2251a fixed to the first fixing portion 2232 and a second portion 2252a fixed to the second fixing portion 2233. In addition, the second regulating member 2250b is provided within the side airbag 2220, and includes a first portion 2251b fixed to the first fixing portion 2242 and a second portion 2252b fixed to the second fixing portion 2243. Hereinafter, the first regulating member 2250a and the second regulating member 2250b will be described as a regulating member 2250 when not distinguished from each other, the first portions 2251a and 2251b will be described as a first portion 2251 when not distinguished from each other, and the second portions 2252a and 2252b will be described as a second portion 2252 when not distinguished from each other.

The regulating member 2250 is a member provided to form a sub inflation portion 2222 to be described later, and is provided on at least one panel (here, the first panel 2230).

The first regulating member 2250a regulates complete inflation of the first panel 2230 at the time of inflation and deployment, and the second regulating member 2250b regulates complete inflation of the second panel 2240 at the time of inflation and deployment. The regulating member 2250 is formed of a single rectangular base cloth. The first regulating member 2250a is coupled to the first panel 2230 at the first fixing portion 2232 and the second fixing portion 2233. The second regulating member 2250b is coupled to the second panel 2240 at the first fixing portion 2242 and the second fixing portion 2243. The first portion 2251a of the first regulating member 2250a and the first fixing portion 2232 of the first panel 2230 are located at the same position on the side airbag 2220, and the second portion 2252a of the first regulating member 2250a and the second fixing portion 2233 of the first panel 2230 are located at the same position on the side airbag 2220. Similarly, the first portion 2251b of the second regulating member 2250b and the first fixing portion 2242 of the second panel 2240 are located at the same position on the side airbag 2220, and the second portion 2252b of the second regulating member 2250b and the second fixing portion 2243 of the second panel 2240 are located at the same position on the side airbag 2220.

Each regulating member 2250 is not fixed to the first panel 2230 or the second panel 2240 on a lateral side (the extending direction and an opposite direction thereto, here, the front-rear direction) with respect to a direction in which the first portion 2251 and the second portion 2252 face each other, and openings 2260 are respectively provided therein. Gas from the inflator 2210 can flow between a main bag 2221 to be described later and the sub inflation portion 2222 through the openings 2260.

The first regulating member 2250a may be fixed to the first fixing portion 2232 and the second fixing portion 2233 at one end and the other end, respectively, as illustrated in FIGS. 29 and 30, or may be fixed to the first fixing portion 2232 and the second fixing portion 2233 at an intermediate portion excluding end portions thereof. In the latter case, at least one of the one end or the other end of the first regulating member 2250a may extend to the edge portion 2231 of the first panel 2230 and the edge portion 2241 of the second panel 2240, and may be coupled to both the edge portions 2231 and 2241.

The second regulating member 2250b (1) may be fixed to the first fixing portion 2242 and the second fixing portion 2243 at an intermediate portion and one end excluding end portions thereof, respectively, as illustrated in FIGS. 29 and 30, (2) may be fixed to the first fixing portion 2242 and the second fixing portion 2243 at the intermediate portion excluding the end portions thereof, or (3) may be fixed to the first fixing portion 2242 and the second fixing portion 2243 at the one end and the other end, respectively. In cases of the above-mentioned (1) and (2), at least one of the one end or the other end of the second regulating member 2250b may extend to the edge portion 2231 of the first panel 2230 and the edge portion 2241 of the second panel 2240, and may be coupled to both the edge portions 2231 and 2241.

A length L21 from the first fixing portion 2232 to the second fixing portion 2233 of the first panel 2230 is longer than a length L22 from the first portion 2251a to the second portion 2252a of the first regulating member 2250a. In addition, a length L31 from the first fixing portion 2242 to the second fixing portion 2243 of the second panel 2240 is longer than a length L32 from the first portion 2251b to the second portion 2252b of the second regulating member 2250b.

As a result, in a case where the regulating member 2250 is made flat at a stage before inflation, a portion from the first fixing portion 2202 to the second fixing portion 2203 of the first panel 2230 or the second panel 2240 becomes slack. In other words, at the stage before inflation, the regulating member 2250 is fixed to the first fixing portion 2202 and the second fixing portion 2203 in a state where the portion from the first fixing portion 2202 to the second fixing portion 2203 of the first panel 2230 or the second panel 2240 is slackened.

The side airbag 2220 includes: a main bag 2221 defined by the first panel 2230 excluding a portion between the first fixing portion 2232 and the second fixing portion 2233, the second panel 2240 excluding a portion between the first fixing portion 2242 and the second fixing portion 2243, and the regulating member 2250; a first sub inflation portion 2222a defined by the first panel 2230 between the first fixing portion 2232 and the second fixing portion 2233, and the first regulating member 2250a; and a second sub inflation portion 2222b defined by the second panel 2240 between the first fixing portion 2142 and the second fixing portion 2143, and the second regulating member 2250b. Hereinafter, the first sub inflation portion 2222a and the second sub inflation portion 2222b will be described as the sub inflation portion 2222 when not distinguished from each other.

The main bag 2221 is a chamber configuring a main portion of the side airbag 2220. The main bag 2221 mainly has a basic function of the far side airbag of protecting the occupant 2040 by being inflated and deployed on the lateral side of the occupant 2040 seated in the vehicle seat 2030. As illustrated in FIG. 29, the main bag 2221 is disposed corresponding to the position from the head portion 2041 to the waist portion 2047 via the shoulder portion 2044, the chest portion 2042, and the abdomen portion 2045 of the occupant 2040, similarly to the entire side airbag 2220.

The first sub inflation portion 2222a is a chamber having a smaller capacity than that of the main bag 2221 provided on the vehicle inner side (the side opposite to the occupant 2040) of the main bag 2221. The first sub inflation portion 2222a has an additional function of the side airbag 2220 of regulating movement of the main bag 2221 in a case where the side airbag 2220 is inflated and deployed between the main bag 2221 and the vehicle and comes into contact with the console box 2060 to receive the occupant 2040. As illustrated in FIGS. 29 and 30, the first sub inflation portion 2222a is disposed along an upper surface of the console box 2060 in the case where the side airbag 2220 is inflated and deployed.

The second sub inflation portion 2222b is a chamber having a smaller capacity than that of the main bag 2221 provided on the occupant 2040 side of the main bag 2221. The second sub inflation portion 2222b has an additional function of the side airbag 2220 of protecting the head portion 2041 of the occupant 2040 by being inflated and deployed between the main bag 2221 and the occupant 2040 seated in the seat. As illustrated in FIGS. 29 and 30, in the case where the side airbag 2220 is inflated and deployed, the second sub inflation portion 2222b is disposed at a position corresponding to the head portion 2041 of the occupant 2040.

In the case where the side airbag 2220 is inflated and deployed, the gas from the inflator 2210 is introduced into the main bag 2221, the second panel 2140 faces the occupant 2040, and the first sub inflation portion 222a comes into contact with the vehicle. Therefore, the first panel 2230 faces the opposite side to the occupant 2040.

More specifically, the inflator 2210 is provided in the main bag 2221, and the gas ejected from the inflator 2210 flows out into the main bag 2221 and then flows into the sub inflation portion 2222 from the main bag 2221 through the openings 2260 for inflation. In the present embodiment, the first sub inflation portion 2222a comes into contact with the console box 2060, and the second sub inflation portion 2222b receives a side surface of the head portion 2041 of the occupant 2040.

Figure 31A:
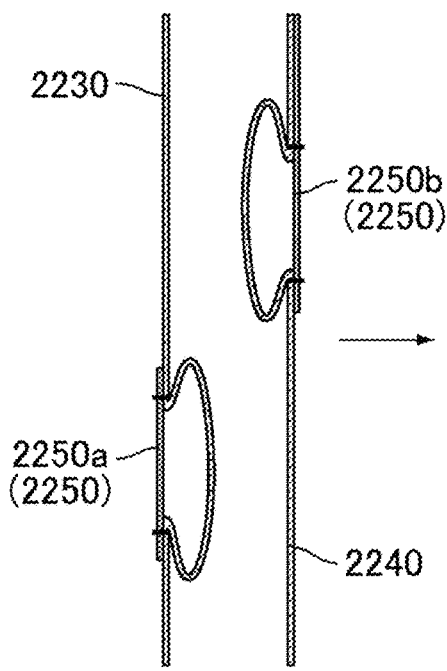
FIG. 31A is a schematic cross-sectional view of a first panel, which is a view illustrating a manufacturing process of the side airbag according to the fourth embodiment.
Figure 31B:
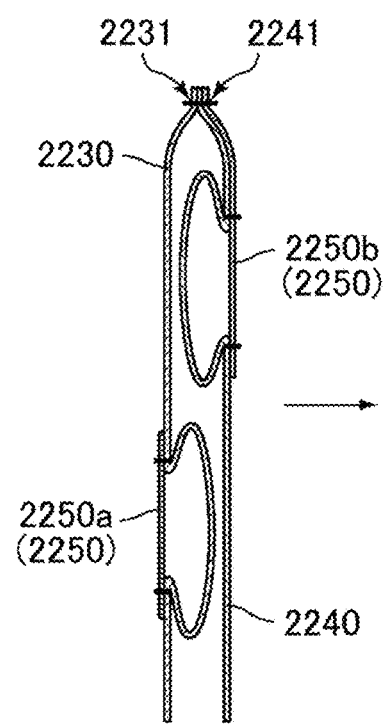
FIG. 31B is a schematic cross-sectional view of a second panel, which is a view illustrating the manufacturing process of the side airbag according to the fourth embodiment.

A manufacturing process of the side airbag 2220 is not particularly limited, and for example, the side airbag 2220 can be manufactured by a process illustrated in FIGS. 31A to 31C. In the present embodiment, a method is adopted in which the first panel 2230 and the second panel 2240 are connected to each other to form a bag shape, and then an inside and an outside of the bag are inverted (turned over).

Similarly to the case of the third embodiment, first, the first panel 2230 and the second panel 2240 are each cut out from the base cloth. A slit (not illustrated) for inserting the inflator 2210 into the side airbag 2220, and a pair of holes (not illustrated) for inserting the pair of bolts 2211 are formed in the first panel 2230. The second panel 2240 is the same as the first panel 2230 except that the slit and the pair of holes are not formed therein.

Next, the first regulating member 2250a and the second regulating member 2250b are each cut out from the base cloth, and as illustrated in FIG. 31A, the first regulating member 2250a and the second regulating member 2250b are coupled to the first panel 2230 and the second panel 2240, respectively.

Next, as illustrated in FIG. 31B, the pair of edge portions 2231 and 2241 of the first panel 2230 and the second panel 2240 are overlapped and be coupled together with the regulating member 2250 on the outer side, thereby defining a bag shape. In this case, the edge portions 2231 and 2241 are partially sewn together to provide an opening for inversion. In addition, in this case, at least one of the one end or the other end of the regulating member 2250 may be overlapped and be coupled to the edge portions 2231 and 2241.

Then, as illustrated in FIG. 31C, the bag is inverted from the opening, and after the inversion, the opening is sewn, whereby the bag-shaped side airbag 2220 can be manufactured.

Examples of a method for the above-mentioned coupling include sewing, adhesion, and welding, of which sewing is particularly preferable.

The base cloth used for the first panel 2230, the second panel 2240, and the regulating member 2250 can be formed of, for example, a thread such as nylon 66 or polyethylene terephthalate (PET). In addition, in order to improve heat resistance, air tightness, or the like, the base cloth may have a surface coated with silicon or the like.

As described above, in the present embodiment, the length L21 from the first fixing portion 2232 to the second fixing portion 2233 of the first panel 2230 is longer than the length L22 from the first portion 2251a to the second portion 2252a of the first regulating member 2250a. Therefore, in a case where the airbag device 2200 is activated and gas is generated from the inflator 2210, the gas is introduced from the inflator 2210 into the main bag 2221, the main bag 2221 is inflated and deployed, and a portion provided with the first regulating member 2250a is inflated and deployed. That is, the first sub inflation portion 2222a is also deployed, and the gas flows in from between the first panel 2230 and the first regulating member 2250a (openings 2260), and the first sub inflation portion 2222a is inflated. In this case, the first sub inflation portion 2222a comes into contact with the vehicle (console box 2060 in the present embodiment). At the time of a side impact of the vehicle, the occupant 2040 seated in the vehicle seat 2030 inclines while moving toward the inner side in the vehicle width direction around the waist portion 2047. Then, the main bag 2221 is inclined toward the inner side in the vehicle width direction by coming into contact with the trunk of the occupant 2040 inclined toward the inner side in the vehicle width direction. In a case where the main bag 2221 is inclined toward the inner side in the vehicle width direction, the first sub inflation portion 2222a is immediately pressed against the upper surface of the console box 2060, such that a reaction force is generated from the upper surface of the console box 2060. Therefore, in a case where this reaction force is applied to the main bag 2221 via the first sub inflation portion 2222a, a force attempting to return the main bag 2221 to the outer side in the vehicle width direction acts, and as a result, movement of the occupant 2040 toward the inner side in the vehicle width direction is prevented at an early stage. That is, the occupant 2040 can be restrained in a state as close to the sitting posture as possible.

In a case where gas is generated from the inflator 2210, a portion provided with the second regulating member 2250b is also inflated and deployed together with the main bag 2221. That is, the second sub inflation portion 2222b is also deployed, and the gas flows in from between the second panel 2240 and the second regulating member 2250b (openings 2260), and the second sub inflation portion 2222b is inflated. In the present embodiment, the length L31 from the first fixing portion 2242 to the second fixing portion 2243 of the second panel 2240 is longer than the length L32 from the first portion 2251b to the second portion 2252b of the second regulating member 2250b. Therefore, similarly to the case of the third embodiment, the second sub inflation portion 2222b is softer than the main bag 2221, and the second sub inflation portion 2222*b* can be quickly brought into contact with the occupant 2040. Therefore, the soft second sub inflation portion 2222*b* defined by a part of the second panel 2240 is interposed between the hard main bag 2221 and the occupant 2040 and can flexibly receive the head portion 2041 of the occupant 2040 at an early stage. This also contributes to restraining the occupant 2040 in a state as close to the sitting posture as possible.

In addition, similarly to the case of the third embodiment, the side airbag 2220 can be easily manufactured.

In addition, in a case where the first sub inflation portion 2222*a* is provided to be in contact with the console box 2060, that is, on a second edge portion 2231*b* side below the side airbag 2220, a first edge portion 2231*a* side on an upper side of the side airbag 2220 is bent to the opposite side to the occupant 2040, but the bending is reduced by providing the second sub inflation portion 2222*b* by a part of the second panel 2240.

In the present embodiment, a ratio (L21/L22) of the length L21 to the length L22 and a ratio (L31/L32) of the length L31 to the length L32 are not particularly limited, and the lengths L22 and L32 are preferably lengths that allow gas to flow from the openings 2260 to the sub inflation portion 2222.

Hereinafter, modifications of the present embodiment will be described.

In the present embodiment, at least one of the first regulating members 2250*a* or the second regulating members 2250*b* may be provided with at least one (for example, one) gas flow hole through which gas can flow.

In the present embodiment, the extending direction along which the first fixing portion 2142 and the second fixing portion 2143 of the second panel 2240 extend is not particularly limited, and may be, for example, the up-down direction or an oblique direction intersecting the up-down direction and the front-rear direction.

In the present embodiment, it is preferable that at least one of the first panel 2230 or the second panel 2240 is provided with at least one (for example, one) of vent holes for discharging gas. In a case where the inflated and deployed side airbag 2220 is pressed, the internal pressure increases, and the reaction force of the side airbag 2220 increases. That is, although the side airbag 2220 becomes hard, absorption characteristics of the side airbag 2220 can be controlled by appropriately discharging the gas from the vent holes.

In the present embodiment, the number of the sub inflation portion 2222 per one side airbag 2220 is not particularly limited, and for example, only one first sub inflation portion 2222*a* may be provided, or three or more sub inflation portions 2222 may be provided.

The present application is based on Japanese patent applications (Japanese Patent Application No. 2021-059099 and Japanese Patent Application No. 2021-059100) filed on Mar. 31, 2021, and the contents thereof are incorporated herein by reference.

INDUSTRIAL APPLICABILITY

According to the present invention, it is possible to provide a side airbag device capable of safely protecting an occupant with easy manufacturing. In addition, according to the present invention, it is possible to provide an airbag device capable of restraining an occupant in a state as close to a sitting posture as possible with easy manufacturing.

REFERENCE SIGNS LIST 1030, 2030: vehicle seat
1031, 2031: seat back (backrest portion)
1032: cover
1033: side frame
1034: cushion pad
1040, 2040: occupant (world side impact dummy)
1041, 2041: head portion
1042, 2042: chest portion
1043, 2043: arm portion
1044, 2044: shoulder portion
1045, 2045: abdomen portion
1046, 2046: back portion
1047, 2047: waist portion
1050, 2050: vehicle side wall
1060: obstacle
2060: console box
1051, 2051: roof side rail
1051A, 2051A: ceiling material
1052, 2052: center pillar (pillar B)
1052A, 2052A: center pillar trim
1053: front pillar (pillar A)
1053A: front pillar trim
2053: side window
2054: front pillar (pillar A)
1100, 1200, 2100, 2200: airbag device
1110, 1210, 2110, 2210: inflator
1111, 2211: bolt
1112, 2212: band
1120, 2220: side airbag
1121, 1221, 2121, 2221: main bag
1122, 1222, 2122, 2222: sub inflation portion
1122*a*: first sub inflation portion
1122*b*: second sub inflation portion
1123, 2223: gas introduction portion
1124, 2224: coupling portion
1125, 2225: fixed cloth (tab)
2126: intermediate of curtain airbag in vehicle height direction
1130, 1230, 2130, 2230: first panel
1131, 1231, 2131, 2231: edge portion
1131*a*, 2131*a*, 2231*a*, 2241*a*: first edge portion
1131*b*, 2131*b*, 1231*b*, 1241*b*: second edge portion
1132, 2132, 1132*a*, 1132*b*, 2202, 1232, 2232, 2242: first fixing portion
1133, 2133, 1133*a*, 1133*b*, 2203, 1233, 2233, 2243: second fixing portion
1134: slit
1135: hole
2136: intermediate portion between first fixing portion and second fixing portion
1140, 2140, 1240, 2240: second panel
1141, 2141, 1241, 2241: edge portion
1150, 2150, 1250, 2250: regulating member
1150*a*, 2250*a*: first regulating member
1151*a*, 1151*b*, 1151, 2151, 1251, 2251, 2251*a*, 2251*b*: first portion
1152*a*, 1152*b*, 1152, 2152, 1252, 2252, 2252*a*, 2252*b*: second portion
1150*b*, 2250*b*: second regulating member
1153: constriction
1160, 2160, 1260, 2260: opening
1220, 2120: curtain airbag (side airbag)
L11, L21: length from first fixing portion to second fixing portion of first panel
L12, L22: length from first portion to second portion of regulating member
L13: length from first fixing portion to first edge portion of first panel L14: length from second fixing portion to second edge portion of first panel L22: length from first portion to second portion of first regulating member L31: length from first fixing portion to second fixing portion of second panel L32: length from first portion to second portion of second regulating member Y1 to Y9: mark

The invention claimed is:

1. An airbag device that inflates and deploys on a lateral side of an occupant seated on a seat of a vehicle, the airbag device comprising:
   an inflator configured to generate gas;
   a first panel including:
      an edge portion;
      a first fixing portion; and
      a second fixing portion facing the first fixing portion;
   a second panel including an edge portion coupled to the edge portion of the first panel, the second panel defining a bag-shaped airbag together with the first panel; and
   a regulating member provided within the airbag, the regulating member including:
      a first portion fixed to the first fixing portion; and
      a second portion fixed to the second fixing portion,
   wherein at least one of the first fixing portion or the second fixing portion is provided at a position different from a position of the edge portion of the first panel,
   a length from the first fixing portion to the second fixing portion of the first panel is longer than a length from the first portion to the second portion of the regulating member,
   the airbag includes:
      a main bag defined by:
         the first panel excluding a portion between the first fixing portion and the second fixing portion;
         the second panel; and
         the regulating member; and
      a sub inflation portion defined by:
         the first panel between the first fixing portion and the second fixing portion; and
         the regulating member,
   in a state where the airbag is inflated and deployed, gas from the inflator is introduced into the main bag, the second panel faces the occupant, and the sub inflation portion comes into contact with the vehicle,
   the airbag includes fixing portions at an upper edge portion thereof, the fixing portions to be attached to an upper portion of a side portion of the vehicle, and
   an intermediate portion between the first fixing portion and the second fixing portion is located on an upper side with respect to a mid-height, in a vehicle height direction, of the airbag.

2. The airbag device according to claim 1,
   wherein the first fixing portion and the second fixing portion are provided at positions different from the position of the edge portion of the first panel,
   the edge portion of the first panel includes:
      a first edge portion located outside of the first panel relative to the first fixing portion; and
      a second edge portion located outside of the first panel relative to the second fixing portion, and
   the length from the first portion to the second portion of the regulating member is shorter than a length from the first fixing portion of the first panel to the first edge portion, and is shorter than a length from the second fixing portion of the first panel to the second edge portion.

3. The airbag device according to claim 1,
   wherein the first fixing portion and the second fixing portion are provided at positions different from the position of the edge portion of the first panel,
   the edge portion of the first panel includes:
      a first edge portion located outside of the first panel relative to the first fixing portion; and
      a second edge portion located outside of the first panel relative to the second fixing portion, and
   a length from the second fixing portion of the first panel to the second edge portion is longer than a length from the first fixing portion of the first panel to the first edge portion.

4. The airbag device according to claim 1,
   wherein two or more of the sub inflation portions are provided in the airbag.

* * * * *